(12) United States Patent
Kim et al.

(10) Patent No.: US 11,841,512 B2
(45) Date of Patent: Dec. 12, 2023

(54) DISPLAY DEVICE

(71) Applicant: Samsung Display Co., Ltd., Yongin-Si (KR)

(72) Inventors: Youngchan Kim, Seoul (KR); Jongho Hong, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 167 days.

(21) Appl. No.: 17/077,347

(22) Filed: Oct. 22, 2020

(65) Prior Publication Data
US 2021/0263324 A1  Aug. 26, 2021

(30) Foreign Application Priority Data
Feb. 21, 2020 (KR) .......................... 10-2020-0021802

(51) Int. Cl.
*G02B 27/01* (2006.01)
*F21V 8/00* (2006.01)
*G02B 27/10* (2006.01)

(52) U.S. Cl.
CPC ....... *G02B 27/0176* (2013.01); *G02B 6/0076* (2013.01); *G02B 27/0172* (2013.01); *G02B 27/102* (2013.01); *G02B 2027/015* (2013.01); *G02B 2027/0112* (2013.01); *G02B 2027/0118* (2013.01); *G02B 2027/0178* (2013.01)

(58) Field of Classification Search
CPC .. G02B 27/01; G02B 27/017; G02B 27/0101; G02B 27/0105; G02B 27/0174; G02B 27/0178; G02B 27/102; G02B 2027/014; G02B 2027/015; G02B 2027/0112; G02B 2027/0118; G02B 6/0066; G02B 6/0068; G02B 6/0073; G02B 6/0076
See application file for complete search history.

(56) References Cited

U.S. PATENT DOCUMENTS

| 10,564,533 | B2 * | 2/2020 | Trisnadi | G02B 27/1033 |
|---|---|---|---|---|
| 10,942,430 | B2 * | 3/2021 | Waldern | G02B 27/0172 |
| 11,092,808 | B1 * | 8/2021 | Lam | G02B 27/0018 |
| 11,156,832 | B1 * | 10/2021 | Keith | G02B 6/0033 |
| 2014/0140653 | A1 * | 5/2014 | Brown | G02B 6/0033 |
| | | | | 385/10 |

(Continued)

FOREIGN PATENT DOCUMENTS

| CN | 104656259 A | 5/2015 |
|---|---|---|
| CN | 107632406 A | 1/2018 |

(Continued)

*Primary Examiner* — Sultan Chowdhury
(74) *Attorney, Agent, or Firm* — CANTOR COLBURN LLP

(57) ABSTRACT

A display device includes a display panel and a light guide unit. The display panel includes a plurality of display units, and the plurality of display units generates a plurality of display light beams with different wavelengths, respectively. The light guide unit receives the display light beams from the plurality of display units. The light guide unit includes a plurality of input diffraction regions which change traveling directions of the display light beams, respectively, a light guide region that guides the display light beams with the changed traveling directions, and an output diffraction region which directs the guided display light beams to a predetermined direction.

20 Claims, 15 Drawing Sheets

(56) References Cited

U.S. PATENT DOCUMENTS

| | | | | |
|---|---|---|---|---|
| 2014/0340650 A1* | 11/2014 | Davis | ............... | H04N 9/3105 |
| | | | | 353/121 |
| 2014/0347634 A1* | 11/2014 | Bommerbach | ........ | G03B 33/14 |
| | | | | 353/121 |
| 2015/0035813 A1* | 2/2015 | Lei | ................. | G09G 3/3208 |
| | | | | 330/261 |
| 2017/0212351 A1* | 7/2017 | Schowengerdt | ......... | G02B 5/18 |
| 2018/0082644 A1* | 3/2018 | Bohn | ................. | G09G 3/001 |
| 2018/0284440 A1* | 10/2018 | Popovich | ........... | G02B 27/0172 |
| 2018/0292654 A1 | 10/2018 | Wall et al. | | |
| 2019/0353898 A1* | 11/2019 | Amirsolaimani | ........ | G02B 6/42 |
| 2022/0269076 A1* | 8/2022 | Yang | ............... | G02B 27/102 |

FOREIGN PATENT DOCUMENTS

| | | | |
|---|---|---|---|
| CN | 108957757 A | 12/2018 | |
| CN | 109239842 A | 1/2019 | |

\* cited by examiner

DISPLAY DEVICE

This application claims priority to Korean Patent Application No. 10-2020-0021802, filed on Feb. 21, 2020, and all the benefits accruing therefrom under 35 U.S.C. § 119, the content of which in its entirety is herein incorporated by reference.

BACKGROUND

1. Field

The disclosure herein relates to a display device, and more particularly, to an augmented reality display device.

2. Description of the Related Art

Augmented reality refers to a technology that superimposes a virtual image on an image of reality seen by a user's eyes and shows the images as a single image. The augmented reality may be implemented using a head-mounted display ("HMD"), a head-up display ("HUP"), or the like. When the augmented reality is implemented using the HMD, the HMD may be provided in the form of glasses such that a user may easily carry it and also easily wear it or take it off.

In a conventional augmented reality display device, a transparent display screen is provided in front of the user to enable the user to continue to see the real world. The display screen is typically a glass waveguide, and a projector is provided on one side of the waveguide. Light from the projector is input to the waveguide by a diffraction grating. The input light is reflected internally in the waveguide, and output through reflection by another diffraction grating such that the user sees the light.

SUMMARY

In an augmented reality display device, where a projector is provided, the projector provides images and/or information that enhance the user's view of the real world. The projector has the desired characteristic of providing high-luminance light, but when the projector is employed, there is a limitation in reducing the overall thickness of the augmented reality display device.

The disclosure provides a display device capable of minimizing light loss with a simple structure.

An embodiment of the invention provides a display device including a display panel and a light guide unit. In such an embodiment, the display panel includes a plurality of display units, where the display units generate a plurality of display light beams with different wavelengths, respectively, and the light guide unit receives the display light beams from the display units. In such an embodiment, the light guide unit includes a plurality of input diffraction regions which changes traveling directions of the display light beams, respectively, a light guide region which guides the display light beams with the changed traveling directions, and an output diffraction region which directs the guided display light beams to a predetermined direction.

In an embodiment, the display panel may include a first display unit which generates a first display light beam with a first wavelength among the display light beams, a second display unit which generates a second display light beam with a second wavelength among the display light beams, and a third display unit which generates a third display light beam with a third wavelength among the display light beams.

In an embodiment, the input diffraction regions may include a first input diffraction region in which a traveling direction of the first display light beam is changed, a second input diffraction region in which a traveling direction of the second display light beam is changed, and a third input diffraction region in which a traveling direction of the third display light beam is changed.

In an embodiment, the light guide unit may include a first waveguide to which the first display light beam is provided, a second waveguide to which the second display light beam is provided, and a third waveguide to which the third display light beam is provided.

In an embodiment, the light guide unit may further include first to third input diffraction patterns. In such an embodiment, the first input diffraction pattern may be disposed on the first waveguide corresponding to the first input diffraction region to change the traveling direction of the first display light beam, the second input diffraction pattern may be disposed on the second waveguide corresponding to the second input diffraction region to change the traveling direction of the second display light beam, and the third input diffraction pattern may be disposed on the third waveguide corresponding to the third input diffraction region to change the traveling direction of the third display light beam.

In an embodiment, the light guide unit may further include first to third output diffraction patterns. The first output diffraction pattern may be disposed on the first waveguide corresponding to the output diffraction region to direct the first display light beam to the predetermined direction, the second output diffraction pattern may be disposed on the second waveguide corresponding to the output diffraction region to direct the second display light beam to the predetermined direction, and the third output diffraction pattern may be disposed on the third waveguide corresponding to the output diffraction region to direct the third display light beam to the predetermined direction.

In an embodiment, the first to third waveguides may be sequentially disposed one on another, and the display panel may be disposed on a rear surface of a waveguide disposed at a bottom, among the first to third waveguides.

In an embodiment, the light guide unit may include a first waveguide which receives the first display light beam and a second waveguide which receives the second display light beam and the third display light beam.

In an embodiment, the light guide unit may further include first to third input diffraction patterns. In such an embodiment, the first input diffraction pattern may be disposed on the first waveguide corresponding to the first input diffraction region to change the traveling direction of the first display light beam, the second input diffraction pattern may be disposed on the second waveguide corresponding to the second input diffraction region to change the traveling direction of the second display light beam, and the third input diffraction pattern may be disposed on the second waveguide corresponding to the third input diffraction region to change the traveling direction of the third display light beam.

In an embodiment, the light guide unit may further include first and second output diffraction patterns. In such an embodiment, the first output diffraction pattern may be disposed on the first waveguide corresponding to the output diffraction region to direct the first display light beam to the predetermined direction, and the second output diffraction pattern may be disposed on the second waveguide corresponding to the output diffraction region to direct the second display light beam and the third display light beam to the predetermined direction.

In an embodiment, the light guide unit may include a waveguide which receives the first to third display light beams.

In an embodiment, the light guide unit may further include first to third input diffraction patterns. In such an embodiment, the first input diffraction pattern may be disposed on the waveguide corresponding to the first input diffraction region to change the traveling direction of the first display light beam, the second input diffraction pattern may be disposed on the waveguide corresponding to the second input diffraction region to change the traveling direction of the second display light beam, and the third input diffraction pattern may be disposed on the waveguide corresponding to the third input diffraction region to change the traveling direction of the third display light beam.

In an embodiment, the light guide unit may further include an output diffraction pattern disposed on the waveguide corresponding to the output diffraction region to direct the first to third display light beams to the predetermined direction.

In an embodiment, the first display light beam may have a wavelength of red color, the second display light beam may have a wavelength of green color, and the third display light beam may have a wavelength of blue color.

In an embodiment, the first display unit may include red pixels, the second display unit may include green pixels, and the third display unit may include blue pixels.

In an embodiment, the display panel may be an organic light emitting display panel.

In an embodiment of the invention, a display device includes first to third display panels and a light guide unit. In such an embodiment, the first display panel generates a first display light beam with a first wavelength, the second display panel generates a second display light beam with a second wavelength, and the third display unit generates a third display light beam with a third wavelength. In such an embodiment, the light guide unit receives the first to third display light beams from the first to third display panels. In such an embodiment, the light guide unit includes first to third input diffraction regions which change traveling directions of the first to third display light beams, respectively, a light guide region which guides the first to third display light beams with the changed traveling directions, and an output diffraction region which directs the guided first to third display light beams to a predetermined direction.

BRIEF DESCRIPTION OF THE DRAWINGS

The above and other features of the invention will become more apparent by describing in further detail embodiments thereof with reference to the accompanying drawings, in which.

DETAILED DESCRIPTION

Figure 1:
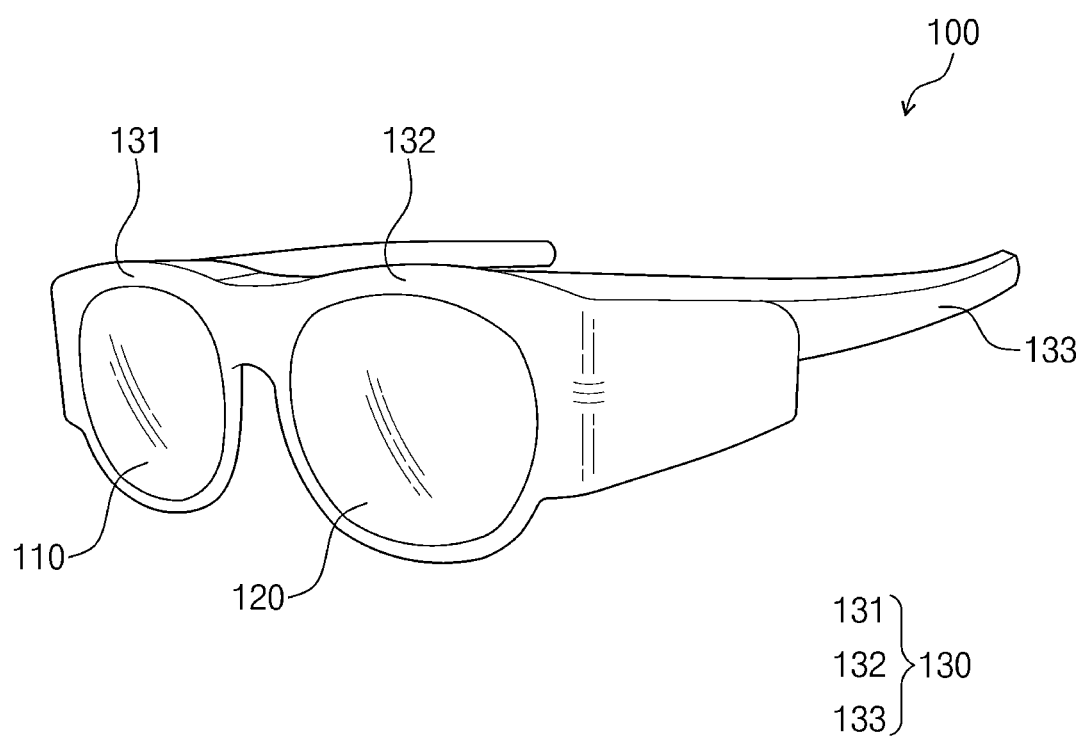
FIG. 1 is a perspective view showing a head-mounted apparatus for providing augmented reality according to an embodiment of the invention.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Terms, such as "beneath", "below", "lower", "above", "upper" and the like, may be used herein for ease of description to describe one element or feature's relationship to another element(s) or feature(s) as illustrated in the figures. It will be understood that the terms are spatially relative terms and are to be described with reference to the orientation depicted in the figures.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will be expressly defined herein unless interpreted in an idealized or overly formal sense.

Embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, embodiments of the invention will be described with reference to the accompanying drawings.

FIG. 1 is a perspective view showing a head-mounted apparatus for providing augmented reality according to an embodiment of the invention.

Referring to FIG. 1, an embodiment of a head-mounted apparatus 100 for providing augmented reality is provided in the form of glasses and generates and shows a virtual image to a user who wears the head-mounted apparatus 100.

In an embodiment, the head-mounted apparatus 100 for providing augmented reality may include a first display device 110, a second display device 120 and a head wearing frame 130.

The first display device 110 is disposed adjacent to the left eye of the user and provides a first virtual image to the left eye of the user. The second display device 120 is disposed adjacent to the right eye of the user and provides a second virtual image to the right eye of the user.

Each of the first and second display devices 110 and 120 may be an augmented reality display device. The head wearing frame 130 may include first and second frames 131 and 13 that are coupled to the first and second display devices 110 and 120 to support the first and second display devices 110 and 120, respectively. The first and second frames 131 and 132 may be connected to each other. The head wearing frame 130 may further include a third frame 133 coupled to be worn on the head of the user. In an embodiment, as shown in FIG. 1, the head-mounted apparatus 100 having a structure in which the third frame 133 is provided in the shape of an eyeglass leg is provided, but is not limited thereto. Alternatively, the third frame 133 may have a band shape or a helmet shape.

Figure 2:
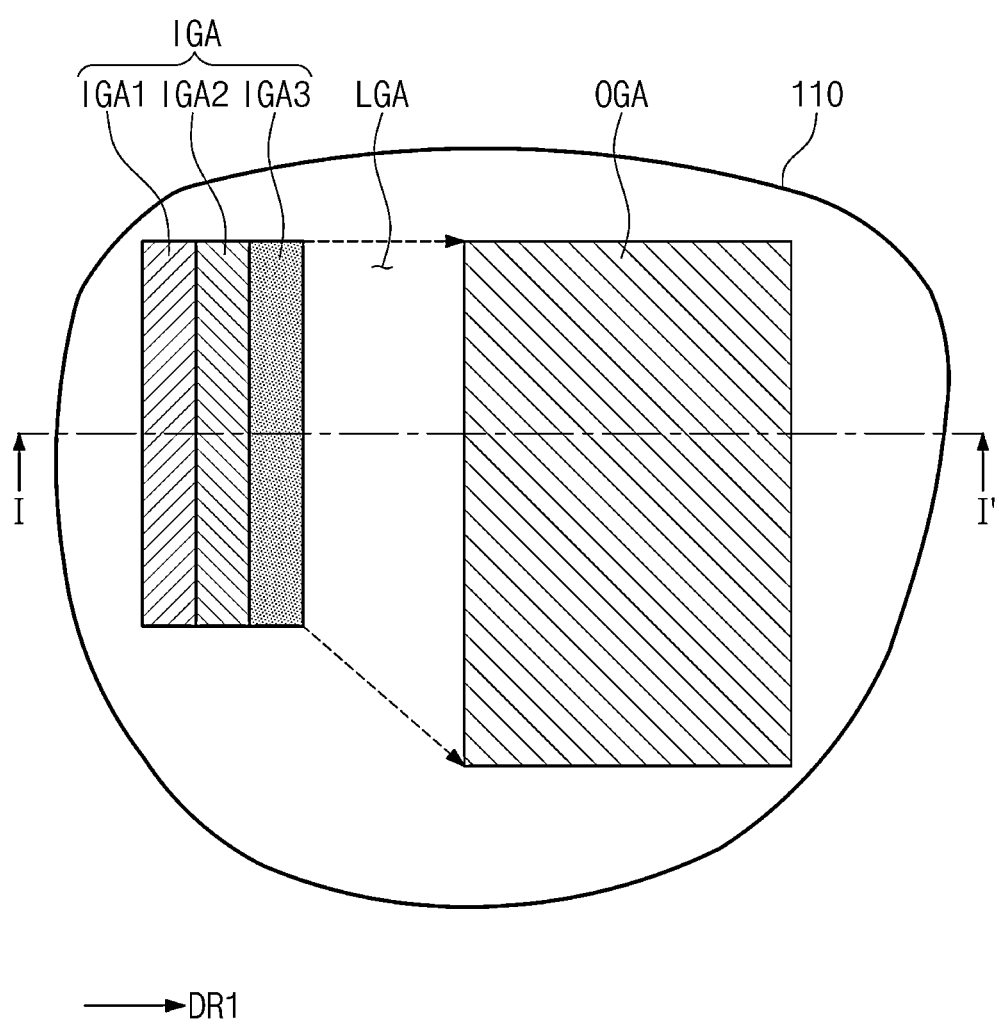
FIG. 2 is a plan view showing a first display device shown in FIG. 1.
Figure 3A:
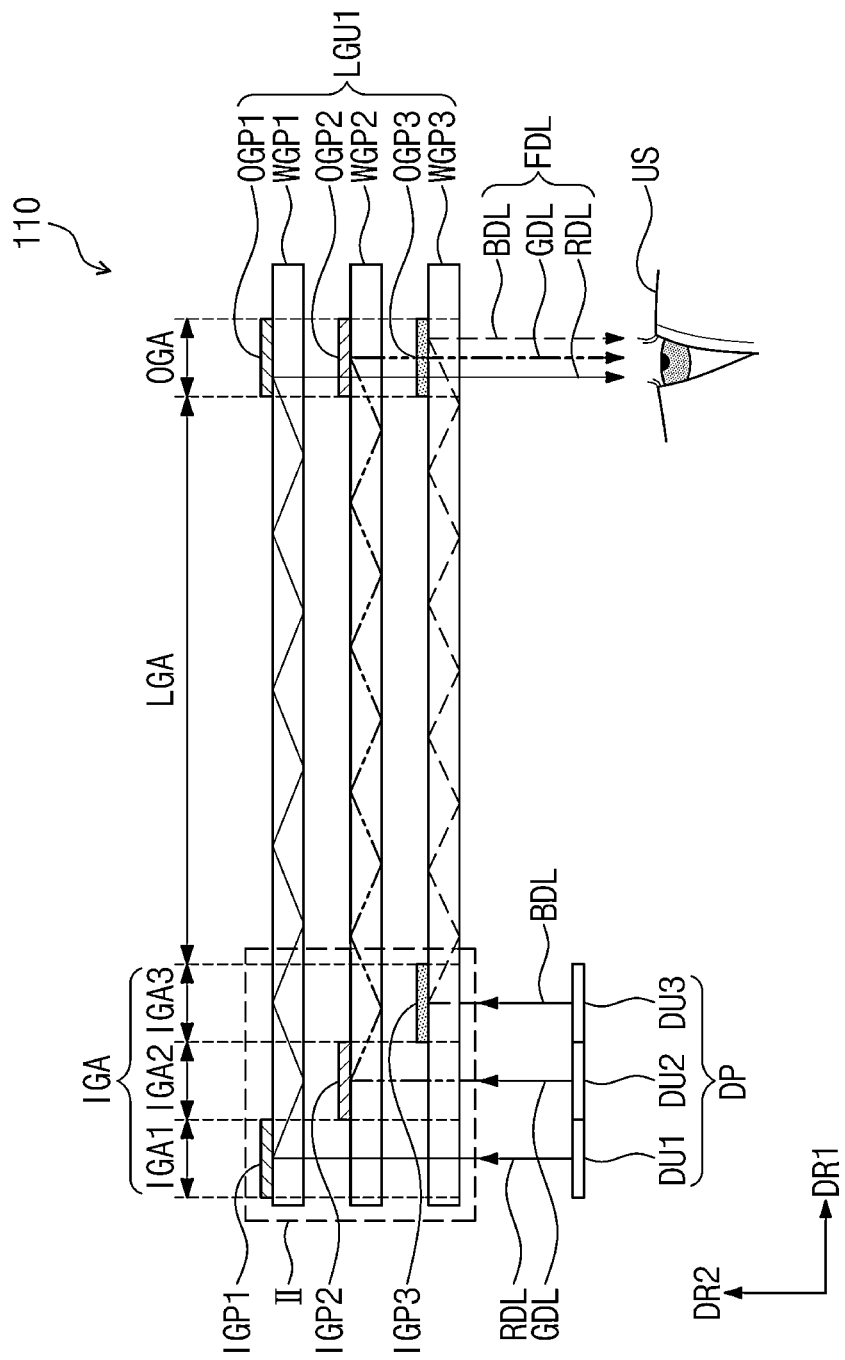
FIG. 3A is a sectional view taken along line I-I' shown in FIG. 2.
Figure 3B:
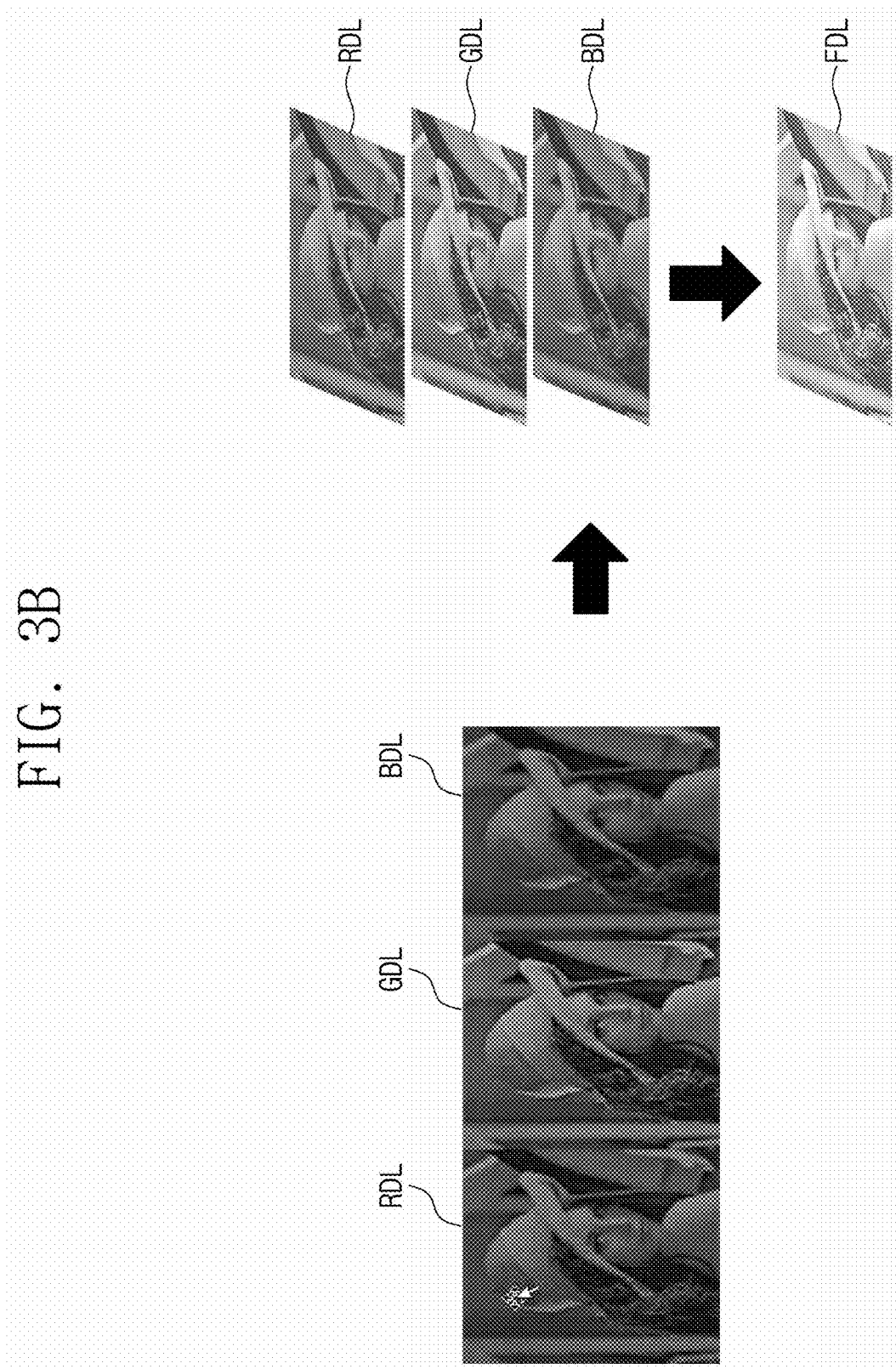
FIG. 3B is a conceptual diagram showing flows of first to third display light beams shown in FIG. 3A.

FIG. 2 is a plan view showing the first display device shown in FIG. 1, FIG. 3A is a sectional view taken along line I-I' shown in FIG. 2, and FIG. 3B is a conceptual diagram showing flows of first to third display light beams shown in FIG. 3A.

Referring to FIGS. 2 and 3A, an embodiment of the first display device 110 includes a display panel DP and a light guide unit LGU1. In such an embodiment, since the second display device 120 (shown in FIG. 1) has the same configuration as the first display device 110, an augmented reality display device to be described below is applicable to both the first and second display devices 110 and 120. Hereinafter, for convenience of description, the first and second display devices 110 and 120 will be referred to as augmented reality display devices.

An embodiment of the augmented reality display device 110 includes the display panel DP and the light guide unit LGU1. The display panel DP may include a plurality of display units, and the plurality of display units generate a plurality of display light beams with different wavelengths, respectively. In one embodiment, for example, the display panel DP includes first, second, and third display units DU1, DU2, and DU3.

In an embodiment, as shown in FIG. 3A, the first, second, and third display units DU1, DU2, and DU3 may be integrally formed as a single display panel DP. However, the embodiment of the invention is not limited thereto. Alternatively, at least two of the first, second, and third display units DU1, DU2, and DU3 may be disposed separately from each other. In one embodiment, for example, the first, second, and third display units DU1, DU2, and DU3 may be first to third display panels, respectively, which are separated from each other. Such an embodiment will be described later in detail with reference to FIGS. 10 and 11.

In an embodiment, the first display unit DU1 generates a first display light beam RDL with a first wavelength, and the second display unit DU2 generates a second display light beam GDL with a second wavelength. The third display unit DU3 generates a third display light beam BDL with a third wavelength. In an embodiment, the first display light beam RDL may have a wavelength of red color, the second display light beam GDL may have a wavelength of green color, and the third display light beam BDL may have a wavelength of blue color.

In such an embodiment, the first display unit DU1 may include red pixels, the second display unit DU2 may include green pixels, and the third display unit DU3 may include blue pixels. Each of the red, green, and blue pixels may include an organic electroluminescent device. In such an embodiment, the display panel DP may be an organic light emitting display panel capable of displaying an image using an organic light emitting device as a light source. However, the embodiment of the invention is not limited thereto. Alternatively, the display panel DP may be a liquid crystal display panel. The configuration of the first, second, and third display units DU1, DU2, and DU3 will be described in greater detail later with reference to FIGS. 4A to 5B.

FIGS. 2 and 3A show an embodiment having a structure in which the display panel DP includes the first, second, and third display units DU1, DU2, and DU3, but the number of display units included in the display panel DP is not limited thereto. In one alternative embodiment, for example, the display panel DP may further include at least one display unit for outputting a same display light beam as at least one of the first, second, and third display units DU1, DU2, and DU3.

The light guide unit LGU1 receives the first, second, and third display light beams RDL, GDL, and BDL from the display panel DP. The light guide unit LGU1 may include an input diffraction region IGA, a light guide region LGA, and an output diffraction region OGA. The display panel DP is disposed on a rear surface of the light guide unit LGU1 corresponding to the input diffraction region IGA.

The input diffraction region IGA includes first, second, and third input diffraction regions IGA1, IGA2, and IGA3. The first, second, and third input diffraction regions IGA1, IGA2, and IGA3 may be sequentially arranged in a first direction DR1 on a plane. The first, second, and third display light beams RDL, GDL, and BDL are provided to the first, second, and third input diffraction regions IGA1, IGA2, and IGA3, respectively. The first, second, and third display units DU1, DU2, and DU3 may be disposed to correspond to the first, second, and third input diffraction regions IGA1, IGA2, and IGA3, respectively.

The traveling directions of the first, second, and third display light beams RDL, GDL, and BDL may be changed to the light guide region LGA in the first, second, and third input diffraction regions IGA1, IGA2, and IGA3, respectively. The first, second, and third display light beams RDL, GDL and BDL, the traveling directions of which are changed, may be provided to the light guide region LGA and then guided to the output diffraction region OGA. The first, second, and third display light beams RDL, GDL, and BDL may be output from the output diffraction region OGA to outside or a predetermined direction.

In an embodiment of the invention, the light guide unit LGU1 may include a first waveguide WGP1, a second waveguide WGP2, and a third waveguide WGP3. The first, second, and third waveguides WGP1, WGP2, and WGP3 may be sequentially disposed or stacked in a second direction DR2 perpendicular to the first direction DR1. The second direction DR2 may be defined as a thickness direction of each of the first, second, and third waveguides WGP1, WGP2, and WGP3. Each of the first, second, and third waveguides WGP1, WGP2, and WGP3 may include or be made of a transparent light-transmitting material, and may include or be made of a material having a relatively high refractive index compared to outside air. Accordingly, a light beam input to each of the first, second, and third waveguides WGP1, WGP2, and WGP3 may be totally reflected on the front and rear surfaces and move along a movement path. In one embodiment, for example, the first, second, and third waveguides WGP1, WGP2, and WGP3 may have a same size as each other.

The light guide unit LGU1 may further include a first input diffraction pattern IGP1, a second input diffraction pattern IGP2, and a third input diffraction pattern IGP3. The first input diffraction pattern IGP1 may be disposed on an upper surface of the first waveguide WGP1 corresponding to the first input diffraction region IGA1. The second input diffraction pattern IGP2 may be disposed on the upper surface of the second waveguide WGP2 corresponding to the second input diffraction region IGA2, and the third input diffraction pattern IGP3 may be disposed on the upper surface of the third waveguide WGP3 corresponding to the third input diffraction region IGA3. The first, second, and third input diffraction patterns IGP1, IGP2, and IGP3 may not overlap each other on a plane or when viewed from a plan view in the second direction DR2.

The first, second, and third input diffraction patterns IGP1, IGP2, and IGP3 may diffract incident light to change a path of the light. Each of the first, second, and third input diffraction patterns IGP1, IGP2, and IGP3 may have a predetermined pattern shape that determines the angle of diffraction depending on the wavelength of light. The first, second, and third input diffraction patterns IGP1, IGP2, and IGP3 may have different pattern shapes from each other. Therefore, when a light beam is input to the first, second, and third input diffraction patterns IGP1, IGP2, and IGP3, the first, second, and third input diffraction patterns IGP1, IGP2, and IGP3 may diffract the light beam at different angles from each other.

The display panel DP may be disposed on the rear surface of the waveguide (that is, the third waveguide WGP3) disposed at the bottom among the first, second, and third waveguides WGP1, WGP2, and WGP3. The display panel DP is disposed corresponding to (or to overlap) the input diffraction regions IGA, and in particular, the first, second, and third display units DU1, DU2, and DU3 may be disposed corresponding to the first, second, and third input diffraction regions IGA1, IGA2, and IGA3, respectively.

The first display light beam RDL output from the first display unit DU1 passes through the second and third waveguides WGP2 and WGP3 and is provided to the first waveguide WGP1. The second display light beam GDL output from the second display panel DU2 passes through the third waveguide WGP3 and is provided to the second waveguide WGP2. The third display light beam BDL output from the third display unit DU3 is directly provided to the third waveguide WGP3.

The first input diffraction pattern IGP1 diffracts the first display light beam RDL input to the first waveguide WGP1 to change the path of the first display light beam RDL. The diffracted first display light beam RDL moves along the light guide region LGA of the first waveguide WGP1 and is provided to the output diffraction region OGA. The second input diffraction pattern IGP2 diffracts the second display light beam GDL input to the second waveguide WGP2 to change the path of the second display light beam GDL. The diffracted second display light beam GDL moves along the light guide region LGA of the second waveguide WGP2 and is provided to the output diffraction region OGA. The third input diffraction pattern IGP3 diffracts the third display light beam BDL input to the third waveguide WGP3 to change the path of the third display light beam BDL. The diffracted third display light beam BDL moves along the light guide region LGA of the third waveguide WGP3 and is provided to the output diffraction region OGA.

The light guide unit LGU1 further includes a first output diffraction pattern OGP1, a second output diffraction pattern OGP2, and a third output diffraction pattern OGP3. In an embodiment of the invention, the first output diffraction pattern OGP1 is disposed on the upper surface of the first waveguide WGP1 corresponding to the output diffraction region OGA. In such an embodiment, the second output diffraction pattern OGP2 is disposed on the upper surface of the second waveguide WGP2 corresponding to the output diffraction region OGA, and the third output diffraction pattern OGP3 is disposed on the upper surface of the third waveguide WGP3 corresponding to the output diffraction region OGA. The output diffraction region OGA may be defined as a viewing region that provides an image to a user.

The first output diffraction pattern OGP1 directs the first display light beam RDL provided from the light guide region LGA to outside or a predetermined direction, e.g., a downward direction (a direction opposite to the second direction DR2), and the second output diffraction pattern OGP2 directs the second display light beam GDL provided from the light guide region LGA to outside. The third output diffraction pattern OGP3 directs the third display light beam BDL provided from the light guide region LGA to outside. When eyeballs or pupils of a user US are located in the viewing region, the user US may receive the first, second, and third display light beams RDL, GDL, and BDL output from the light guide unit LGU1 in the output diffraction region OGA.

In an embodiment, as shown in FIGS. 3A and 3B, the first, second, and third display light beams RDL, GDL, and BDL are output from the first, second, and third display units DU1, DU2, and DU3 of the display panel DP. The first, second, and third display light beams RDL, GDL, and BDL output from the display panel DP are guided to the output diffraction region OGA through the light guide unit LGU1. The first, second, and third display light beams RDL, GDL, and BDL are diffracted by the first, second, and third output diffraction patterns OGP1, OGP2, and OGP3, respectively and are output, in the output diffraction region OGA. Here, the output first, second, and third display light beams RDL, GDL, and BDL may be mixed and provided to the eyeballs of the user US as a display light FDL. In such an embodiment, assuming that the first, second, and third display light beams RDL, GDL, and BDL each have a luminance of about 200 candela per square meter ($cd/m^2$), final display light FDL finally provided to the eyeballs of the user US may have a luminance of about 600 $cd/m^2$, which is the total luminance of the first, second, and third display light beams RDL, GDL, and BDL.

In such an embodiment, as described above, the augmented reality display device 110 uses the display panel DP divided into a plurality of display units, where each display unit outputs a display light beam with a different wavelength, and outputs a plurality of display light beams in a same output diffraction region OGA. In such an embodiment, the final display light FDL finally provided to the user US may have higher luminance than the individual display light. As a result, the overall luminance of the augmented reality display device 110 may be improved, and the augmented reality display device 110 having a simple structure may be implemented by employing the display panel DP.

Figure 4A:
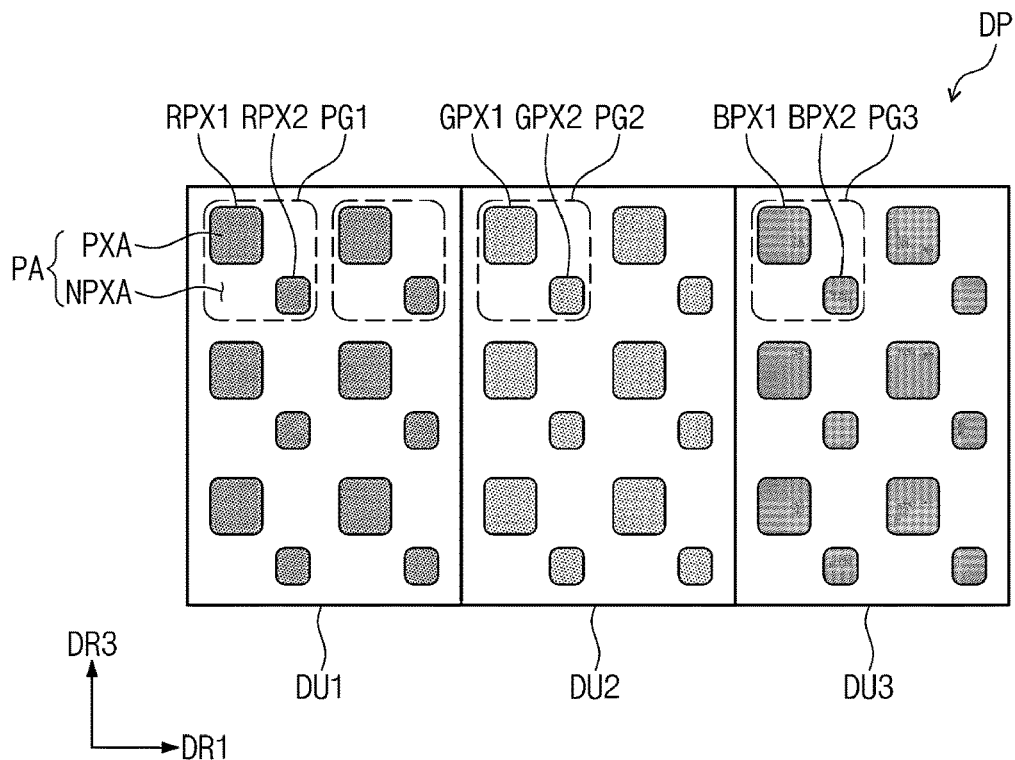
FIG. 4A is a plan view showing a pixel structure of a display panel according to an embodiment of the invention.
Figure 4B:
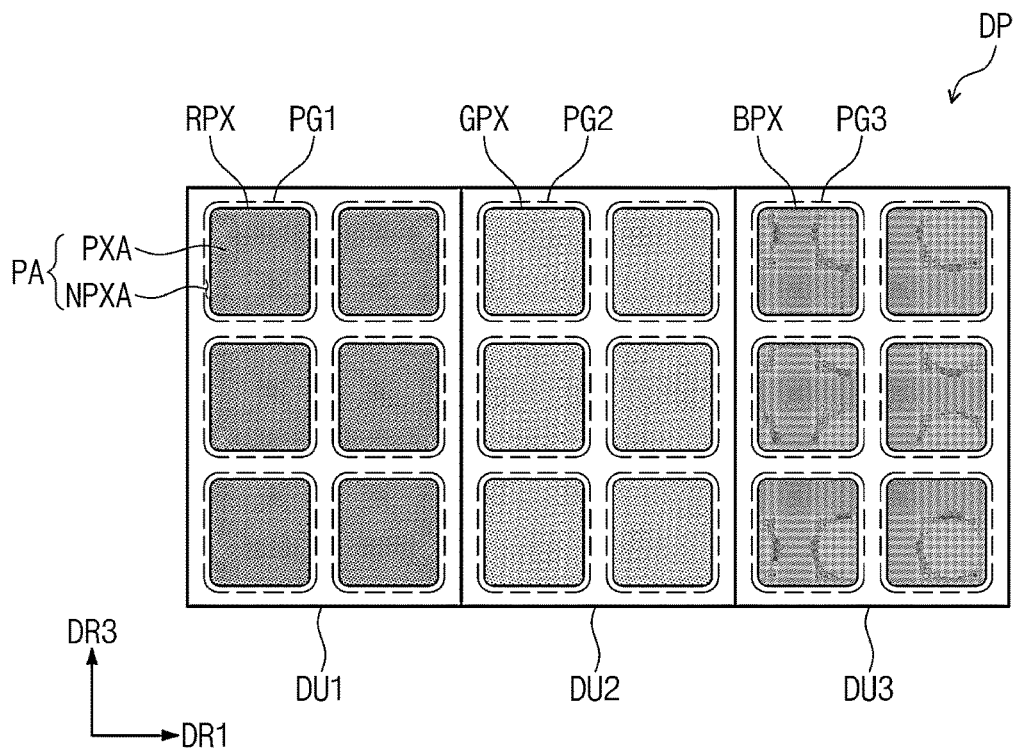
FIG. 4B is a plan view showing a pixel structure of a display panel according to an embodiment of the invention.
Figure 5A:
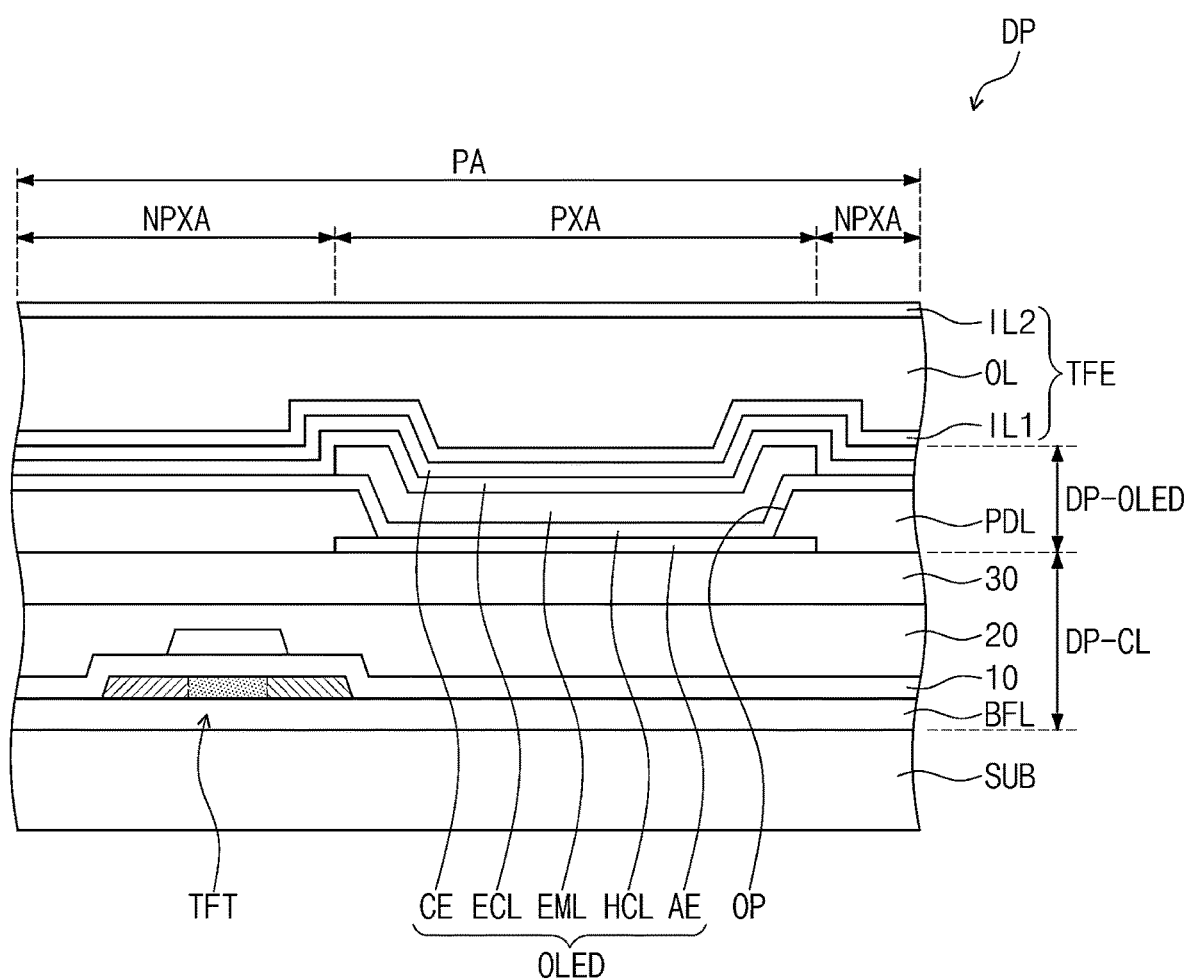
FIG. 5A is a sectional view showing a pixel area of the display panel shown in FIG. 4A.
Figure 5B:
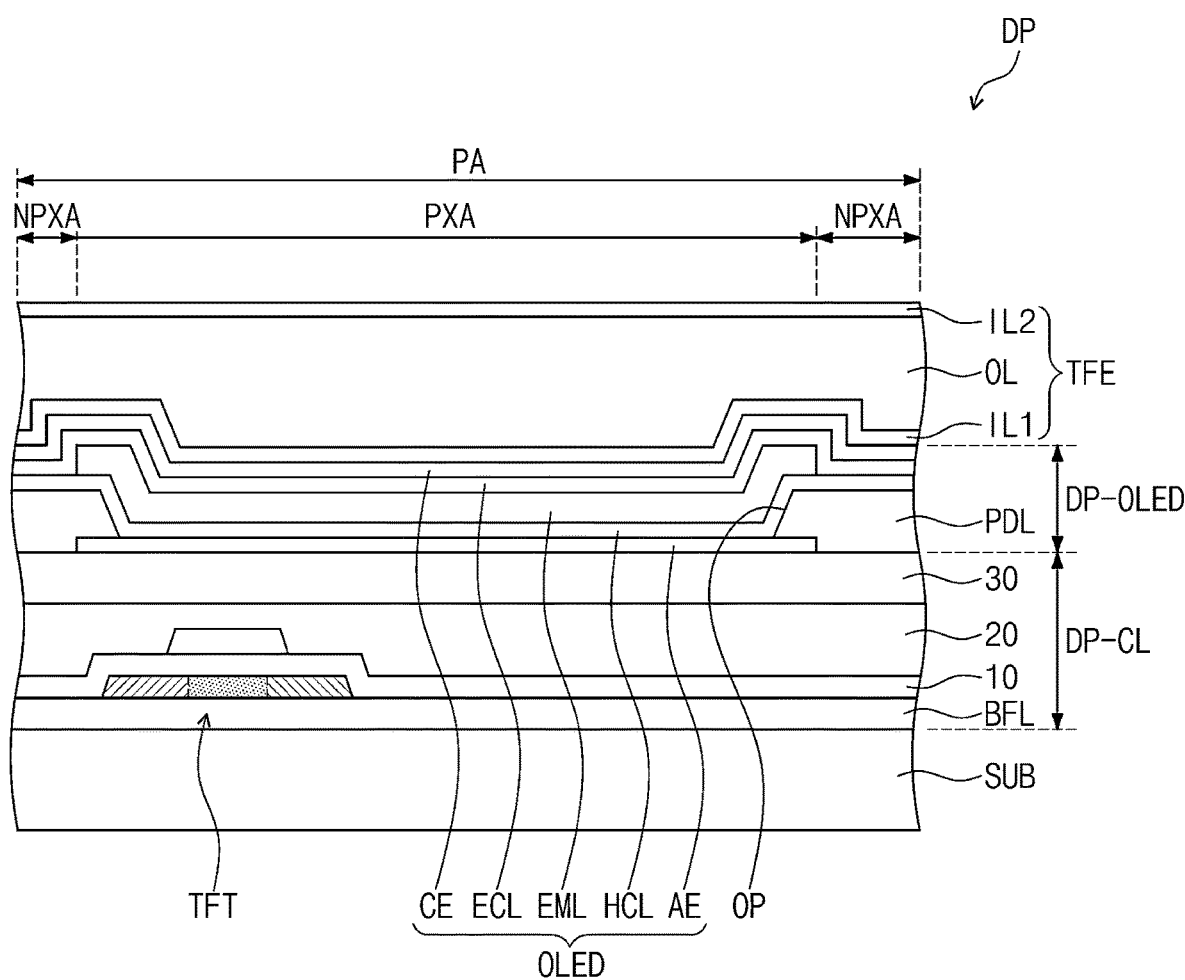
FIG. 5B is a sectional view showing a pixel area of the display panel shown in FIG. 4B.

FIG. 4A is a plan view showing a pixel structure of a display panel according to an embodiment of the invention, and FIG. 4B is a plan view showing a pixel structure of a display panel according to an embodiment of the invention. FIG. 5A is a sectional view showing a pixel area of the display panel shown in FIG. 4A, and FIG. 5B is a sectional view showing a pixel area of the display panel shown in FIG. 4B.

Referring to FIGS. 3A to 4A, an embodiment of the display device DP according to the invention includes first, second, and third display units DU1, DU2, and DU3. The first display unit DU1 includes a plurality of red pixels, the second display unit DU2 includes a plurality of green pixels, and the third display unit DU3 includes a plurality of blue pixels.

In an embodiment of the invention, the first display unit DU1 may have a structure in which a plurality of first pixel groups PG1 are repeatedly arranged in the first and third directions DR1 and DR3. The third direction DR3 may be a direction perpendicular to the first direction DR1 on a plane. Each of the first pixel groups PG1 may include a first red pixel RPX1 and a second red pixel RPX2. The first red pixel RPX1 may have a different size from the second red pixel RPX2. In one embodiment, for example, the first red pixel RPX1 may have a larger size than the second red pixel RPX2. In an embodiment, the first display unit DU1 may have a resolution of n×m, where each of n and m are natural numbers.

The second display unit DU2 may have a structure in which a plurality of second pixel groups PG2 are repeatedly arranged in the first and third directions DR1 and DR3. Each of the second pixel groups PG2 may include a first green pixel GPX1 and a second green pixel GPX2. The first green pixel GPX1 may have a different size from the second green pixel GPX2. In one embodiment, for example, the first green pixel GPX1 may have a larger size than the second green pixel GPX2. In an embodiment, the second display unit DU2 may have a resolution of n×m. In an embodiment, the second display unit DU2 may have a same resolution as the first display unit DU1.

The third display unit DU3 may have a structure in which a plurality of third pixel groups PG3 are repeatedly arranged in the first and third directions DR1 and DR3. Each of the third pixel groups PG3 may include a first blue pixel BPX1 and a second blue pixel BPX2. The first blue pixel BPX1 may have a different size from the second blue pixel BPX2. In one embodiment, for example, the first blue pixel BPX1 may have a larger size than the second blue pixel BPX2. In an embodiment, the third display unit DU3 may have a resolution of n×m. In an embodiment, the third display unit DU3 may have the same resolution as the first and second display units DU1 and DU2.

The first, second, and third display light beams RDL, GDL, and BDL output from the display panel DP may be mixed through the light guide unit LGU1 and provided to the eyeballs of the user US as the final display light FDL. The final display light FDL finally provided to the eyeballs of the user US may have a higher resolution than each of the first, second, and third display light beams RDL, GDL, and BDL. When each of the first, second, and third display light beams RDL, GDL, and BDL has a resolution of n×m, the final display light FDL may have a resolution of 3n×3m.

In an embodiment of the invention, as described above, the final display light FDL provided to the eyeballs of the user US may have a higher luminance and higher resolution than each of the first, second, and third display light beams RDL, GDL, and BDL.

Referring to FIG. 5A, the display panel DP includes a base layer SUB, a circuit layer DP-CL disposed on the base layer SUB, a display element layer DP-OLED, and a thin-film encapsulation layer TFE. The base layer SUB may include a plastic film. The base layer SUB may be a flexible substrate and may include a plastic substrate, a glass substrate, a metal substrate, or an organic or inorganic composite substrate.

The circuit layer DP-CL may include an intermediate insulating layer, a plurality of conductive layers, and semiconductor layers. The plurality of conductive layers of the circuit layer DP-CL may constitute signal lines or pixel circuits. The pixel circuit may include thin-film transistors TFT and a capacitor.

The display element layer DP-OLED is disposed on the circuit layer DP-CL. In one embodiment, for example, the display element layer DP-OLED may be disposed corresponding to the display region DA. The display element layer DP-OLED may include a display element, for example, an organic light emitting diode.

The thin-film encapsulation layer TFE may be disposed or provided directly on the display element layer DP-OLED or directly on a functional layer disposed on the display element layer DP-OLED. The thin-film encapsulation layer TFE may be manufactured through a continuous process of the display element layer DP-OLED.

The thin-film encapsulation layer TFE may include at least one inorganic layer IL1 and IL2 and at least one organic layer OL. The inorganic layer protects the display element layer DP-OLED from moisture and oxygen, and the organic layer protects the display element layer DP-OLED from foreign substances such as dust particles.

In an embodiment, as shown in FIG. 5A, the circuit layer DP-CL is disposed on the base layer SUB. The circuit layer DP-CL may include a plurality of insulating layers BFL, 10, 20, and 30 and a thin film transistor TFT. Each of the plurality of insulating layers BFL, 10, 20, and 30 may include an organic material and/or an inorganic material, and may have a single layer or multi-layer structure. Some of the plurality of insulating layers BFL, 10, 20, and 30, for example, the buffer layer BFL, may be omitted, and another insulating layer may be further disposed.

The display element layer DP-OLED is disposed on the circuit layer DP-CL. The display element layer DP-OLED may include a pixel defining layer PDL and an organic light emitting diode OLED. Each pixel region PA of the display panel DP may be divided into a light emitting region PXA, in which the organic light emitting diode OLED is disposed, and a non-light emitting regions NPXA adjacent thereto, on a plane. An opening OP is defined through the pixel defining layer PDL to expose at least a portion of a first electrode AE. The opening OP of the pixel defining layer PDL may correspond to the light emitting region PXA.

The organic light emitting diode OLED may include the first electrode AE, a second electrode CE, and a light emitting functional layer disposed between the first electrode AE and the second electrode CE. In one embodiment of the invention, for example, an organic light emitting diode OLED may have a front emission structure that emits light toward the second electrode CE, as shown in FIG. 5A. The second electrode CE is disposed closer to the thin-film encapsulation layer TFE than the first electrode AE.

In an embodiment, as shown in FIG. 5A, the light emitting functional layer includes a first charge control layer HCL, a light emitting layer EML, and a second charge control layer ECL, but the stacked structure of the light emitting functional layer is not limited thereto. The emission layer EML may include an organic light emitting material in which a host and a dopant are mixed and/or an inorganic light emitting material such as semiconductor nanocrystals (for example, quantum dots, quantum rods, and quantum tubes). Each of the first charge control layer HCL and the second charge control layer ECL injects and/or transports a corresponding charge among electrons or holes. Although not separately shown, the light emitting functional layer and the second electrode CE may be commonly disposed in the plurality of light emitting regions PXA and the non-light emitting regions NPXA adjacent thereto.

The first electrode AE may include a reflective layer. In one embodiment, for example, the reflective layer may include at least any one selected from silver (Ag), magnesium (Mg), aluminum (Al), platinum (Pt), palladium (Pd), gold (Au), nickel (Ni), neodymium (Nd), iridium (Ir), and chromium (Cr). A transparent layer or a translucent layer may be further disposed to the first electrode AE, which include or is made of at least one selected from indium tin oxide ("ITO"), indium zinc oxide ("IZO"), zinc oxide (ZnO), indium oxide (In$_2$O$_3$), indium gallium oxide ("IGO") and aluminum zinc oxide ("AZO"). In an embodiment of the invention, the first electrode AE may include three layers of ITO/silver (Ag)/ITO.

The second electrode CE may include a conductive material having a small absorption and a high reflectance. The second electrode CE may be a translucent electrode to define a resonance structure with the first electrode AE. The second electrode CE may include a conductive material having a product of a refractive index and an extinction ratio of 1 to 10 in a visible region. In one embodiment, for example, the second electrode CE may include at least one material selected from silver (Ag), aluminum (Al), ytterbium (Yb), titanium (Ti), magnesium (Mg), nickel (Ni), lithium (Li), calcium (Ca), copper (Cu), LiF/Ca, LiF/Al, MgAg, and CaAg.

Referring to FIGS. 3A, 3B, 4B and 5B, an embodiment of the display panel DP includes first, second, and third display units DU1, DU2, and DU3. The first display unit DU1 includes a plurality of red pixels RPX, the second display unit DU2 includes a plurality of green pixels GPX, and the third display unit DU3 includes a plurality of blue pixels BPX.

In an embodiment of the invention, the first display unit DU1 may have a structure in which the plurality of red pixels RPX are repeatedly arranged in the first and third directions DR1 and DR3. In such an embodiment, the second display unit DU2 may have a structure in which the plurality of green pixels GPX are repeatedly arranged in the first and third directions DR1 and DR3. In such an embodiment, the third display unit DU3 may have a structure in which the plurality of blue pixels BPX are repeatedly arranged in the first and third directions DR1 and DR3.

In an embodiment, as shown in FIGS. 4B and 5B, one red pixel RPX is provided in the first pixel group PG1, one green pixel GPX is provided in the second pixel group PG2, and one blue pixel BPX may be provided in the third pixel group PG3. In an embodiment, where the first pixel group PG1 shown in FIGS. 4B and 5B have a same size as the first pixel group PG1 shown in FIGS. 4A and 5A, the red pixel RPX may have a larger size than the first and second red pixels RPX1 and RPX2.

The red pixel RPX of FIGS. 4B and 5B may have a light emitting region PXA larger than the first and second red pixels RPX1 and RPX2 of FIGS. 4A and 5A. In an embodiment, the light emitting region PXA of the red pixel RPX may have an area larger than the total sum of the light emitting region PXA of the first red pixel RPX1 and the light emitting region PXA of the second red pixel RPX2.

In such an embodiment, the size of the opening OP defined in the pixel defining layer PDL may be expanded to increase the area occupied by the light emitting region PXA in each pixel region PA. In an embodiment, as described above, when the area occupied by the light emitting region PXA in each pixel region PA increases, the area of the non-light emitting region NPXA decreases relatively, and thus the aperture ratio of the display panel DP increases, and as a result, the overall luminance of the display panel DP may increase.

In such an embodiment, as described above, the first, second, and third display light beams RDL, GDL, and BDL output from the display panel DP may be mixed through the light guide unit LGU1 and provided to the eyeballs of the user US as the final display light FDL. The final display light FDL finally provided to the eyeballs of the user US may have a higher resolution than each of the first, second, and third display light beams RDL, GDL, and BDL. When each of the first, second, and third display light beams RDL, GDL, and BDL has a resolution of n×m, the final display light FDL may have a resolution of 3n×3m.

In an embodiment, as described above, the final display light FDL provided to the eyeballs of the user US may have a higher luminance and higher resolution than each of the first, second, and third display light beams RDL, GDL, and BDL.

Figure 6:
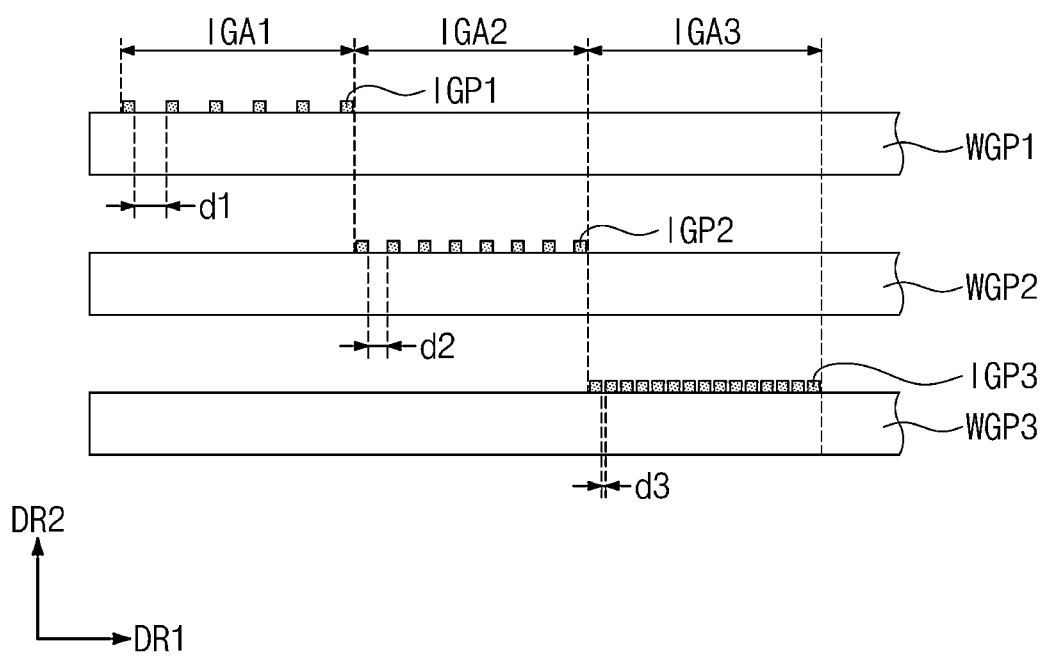
FIG. 6 is an enlarged view of part II shown in FIG. 3A.

FIG. 6 is an enlarged view of part II shown in FIG. 3A.

Referring to FIG. 6, an embodiment of the light guide unit may include a first input diffraction pattern IGP1, a second input diffraction pattern IGP2 and a third input diffraction pattern IGP3.

The first input diffraction pattern IGP1 is disposed on an upper surface of the first waveguide WGP1 corresponding to the first input diffraction region IGA1. The first input diffraction pattern IGP1 is a diffraction optical element and may include a plurality of nano-sized diffraction gratings. The plurality of diffraction gratings may be set to diffract only the first display light beam RDL having a first wavelength. FIG. 6 shows an embodiment where a plurality of diffraction gratings is provided as separate members on the upper surface of the first waveguide WGP1, but the embodiment of the invention is not limited thereto. In one alternatively embodiment, for example, the upper surface of the first waveguide WGP1 may be processed to include portions defining diffraction gratings integrally with the first waveguide WGP1.

In an embodiment, the first input diffraction pattern IGP1 may include a holographic optical element. The holographic optical element may include a diffraction grating generated by recording an interference fringe in a photosensitive polymer. The interference fringe may be set to diffract only the first display light beam RDL having the first wavelength.

In an embodiment of the invention, each of the first, second, and third input diffraction patterns IGP1, IGP2, and IGP3 may include diffraction gratings provided in different forms. In one embodiment, for example, the first, second, and third input diffraction patterns IGP1, IGP2, and IGP3 may include diffraction gratings arranged at intervals different to each other. In an embodiment, the first input diffraction pattern IGP1 includes diffraction gratings arranged at first intervals d1, the second input diffraction pattern IGP2 includes diffraction gratings arranged at second intervals d2, and the third input diffraction pattern IGP3 may include diffraction gratings arranged at third intervals d3. In such an embodiment, the width and height of the diffraction gratings may be variously designed or modified to diffract only light of a desired wavelength. In an embodiment, a direction in which diffracted light travels may be determined based on an arrangement direction and an extension direction of the diffraction gratings.

Although not shown in FIG. 6, the first, second, and third output diffraction patterns OGP1, OGP2, and OGP3 may also include diffractive optical elements or holographic optical elements.

Figure 7:
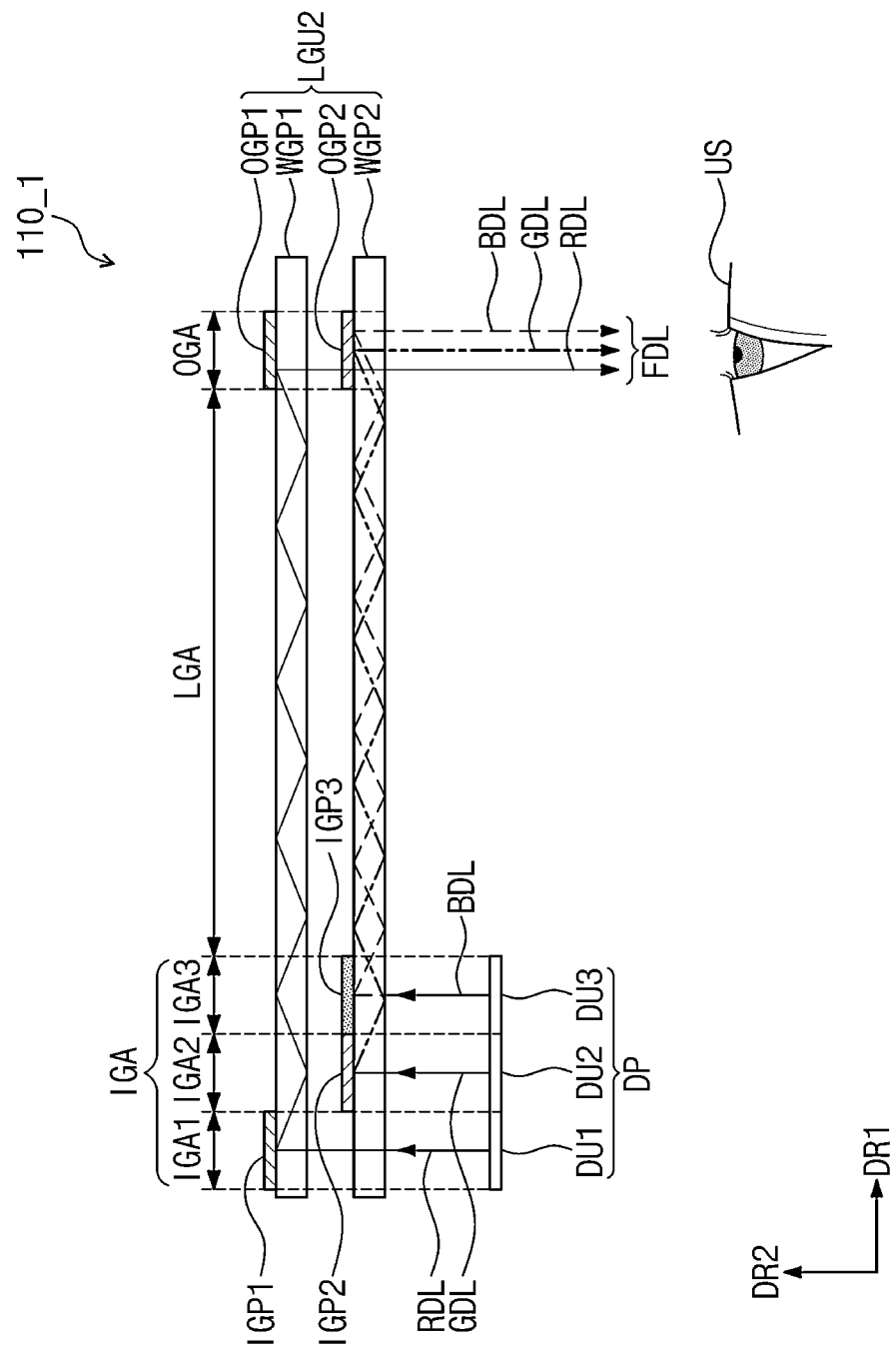
FIG. 7 is a sectional view of a display device according to an alternative embodiment of the invention.

FIG. 7 is a sectional view of an augmented reality display device according to an alternative embodiment of the invention.

Referring to FIG. 7, an embodiment of an augmented reality display device 110_1 includes a display panel DP and a light guide unit LGU2. The display panel DP may include a plurality of display units, where each display unit generates a display light beam with a different wavelength. In one embodiment, for example, the display panel DP includes first, second, and third display units DU1, DU2, and DU3. Since the display panel DP shown in FIG. 7 has a structure similar to that of the display panel DP shown in FIG. 3A, any repetitive detailed description of the same or like elements of the display panel DP will be omitted.

In an embodiment, the light guide unit LGU2 receives the first, second, and third display light beams RDL, GDL, and BDL from the display panel DP. The light guide unit LGU2 may include a first waveguide WGP1 and a second waveguide WGP 2. The first and second waveguides WGP1 and WGP2 may be sequentially disposed or stacked in the second direction DR2 perpendicular to the first direction DR1.

The light guide unit LGU2 may further include a first input diffraction pattern IGP1, a second input diffraction pattern IGP2, and a third input diffraction pattern IGP3. The first input diffraction pattern IGP1 may be disposed on an upper surface of the first waveguide WGP1 corresponding to the first input diffraction region IGA1. The second input diffraction pattern IGP2 may be disposed on the upper surface of the second waveguide WGP2 corresponding to the second input diffraction region IGA2, and the third input diffraction pattern IGP3 may be disposed on the upper surface of the second waveguide WGP2 corresponding to the third input diffraction region IGA3. The first, second, and third input diffraction patterns IGP1, IGP2, and IGP3 may not overlap each other on a plane.

The first, second, and third input diffraction patterns IGP1, IGP2, and IGP3 may diffract incident light to change a path of the light. Each of the first, second, and third input diffraction patterns IGP1, IGP2, and IGP3 may have a predetermined grating shape that determines the angle of diffraction depending on the wavelength of light. The first, second, and third input diffraction patterns IGP1, IGP2, and IGP3 may have different grating shapes from each other. Therefore, when a light beam is input to the first, second, and third input diffraction patterns IGP1, IGP2, and IGP3, the first, second, and third input diffraction patterns IGP1, IGP2, and IGP3 may diffract the light beam at different angles, respectively.

The display panel DP may be disposed on the rear surface of the second waveguide WGP2. The display panel DP is disposed corresponding to the input diffraction regions IGA. In one embodiment, for example, the first, second, and third display units DU1, DU2, and DU3 may be disposed corresponding to the first, second, and third input diffraction regions IGA1, IGA2, and IGA3, respectively.

The first display light beam RDL output from the first display panel DP2 passes through the second waveguide WGP2 and is provided to the first waveguide WGP1. The second and third display light beams GDL and BDL output from the second display unit DU2 are directly provided to the second waveguide WGP2.

The first input diffraction pattern IGP1 diffracts the first display light beam RDL input to the first waveguide WGP1 to change the path of the first display light beam RDL. The diffracted first display light beam RDL moves along the light guide region LGA of the first waveguide WGP1 and is provided to the output diffraction region OGA. The second input diffraction pattern IGP2 diffracts the second display light beam GDL input to the second waveguide WGP2 to change the path of the second display light beam GDL. The diffracted second display light beam GDL moves along the light guide region LGA of the second waveguide WGP2 and is provided to the output diffraction region OGA. The third input diffraction pattern IGP3 diffracts the third display light beam BDL input to the second waveguide WGP2 to change the path of the third display light beam BDL. The diffracted third display light beam BDL moves along the light guide region LGA of the second waveguide WGP2 and is provided to the output diffraction region OGA.

The light guide unit LGU2 may further include first and second output diffraction patterns OGP1 and OGP2. In one embodiment, for example, the first output diffraction pattern OGP1 is disposed on the upper surface of the first waveguide WGP1 corresponding to the output diffraction region OGA, and the second output diffraction pattern OGP2 is disposed on the upper surface of the second waveguide WGP2 corresponding to the output diffraction region OGA. The output diffraction region OGA may be defined as a viewing region that provides an image to a user US.

The first output diffraction pattern OGP1 directs the first display light beam RDL provided from the light guide region LGA to outside, and the second output diffraction pattern OGP2 directs the second and third display light beams GDL and BDL provided from the light guide region LGA to outside. When the eyeballs of the user are located in the viewing region, the user US may receive the first, second, and third display light beams RDL, GDL, and BDL output from the light guide unit LGU2 in the output diffraction region OGA. In such an embodiment, the first, second, and third display light beams RDL, GDL, and BDL are diffracted by the first and second output diffraction patterns OGP1 and OGP2, respectively and are output, in the output diffraction region OGA. In such an embodiment, the output first, second, and third display light beams RDL, GDL, and BDL may be mixed and provided to the eyeballs of the user US as a display light FDL.

In an embodiment, as described above, the augmented reality display device 110_1 uses the display panel DP divided into a plurality of display units, where each display unit outputs a display light beam with a different wavelength, and outputs a plurality of display light beams in a same output diffraction region OGA. In such an embodiment, the final display light FDL provided to the user may have a higher luminance than the individual display light. Accordingly, the overall luminance of the augmented reality display device 110_1 may increase. In an embodiment, as shown in FIG. 7, the number of waveguides may be reduced to two, and as a result, the augmented reality display device 110_1 having a simple structure and a thin thickness may be implemented.

Figure 8:
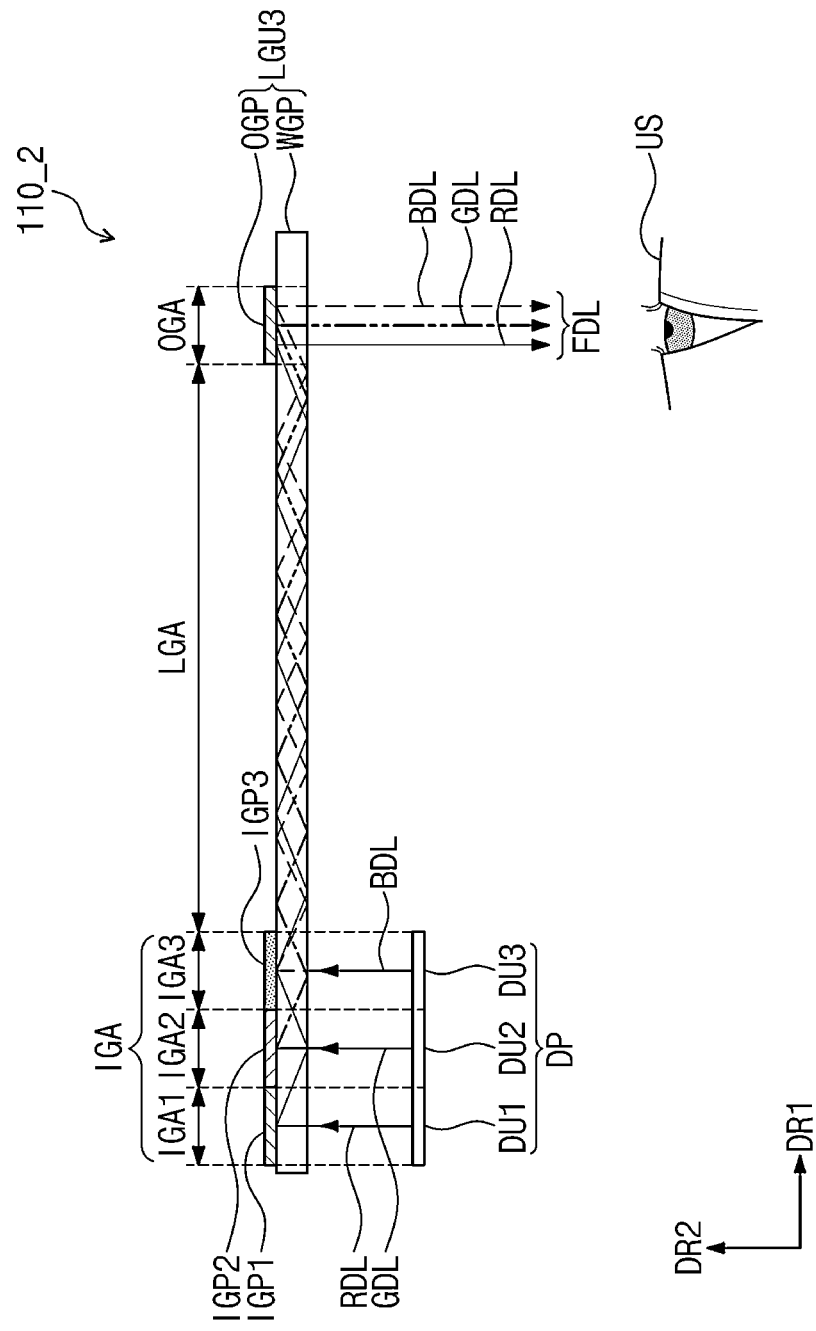
FIG. 8 is a sectional view of a display device according to another alternative embodiment of the invention.

FIG. 8 is a sectional view of an augmented reality display device according to another alternative embodiment of the invention.

Referring to FIG. 8, an embodiment of an augmented reality display device 110_2 includes a display panel DP and a light guide unit LGU3. The display panel DP may include a plurality of display units, each display unit generating a display light beam with a different wavelength. In one embodiment, for example, the display panel DP includes first, second, and third display units DU1, DU2, and DU3. Since the display panel DP shown in FIG. 8 has a structure similar to that of the display panel DP shown in FIG. 3A, any repetitive detailed description of the same or like elements of the display panel DP will be omitted.

The light guide unit LGU3 receives the first, second, and third display light beams RDL, GDL, and BDL from the display panel DP. The light guide unit LGU3 may include one waveguide WGP.

The light guide unit LGU3 may further include a first input diffraction pattern IGP1, a second input diffraction pattern IGP2, and a third input diffraction pattern IGP3. The first, second, and third input diffraction patterns IGP1, IGP2, and IGP3 may be disposed on the upper surface of the waveguide WGP corresponding to the first, second, and third input diffraction regions IGA1, IGA2, and IGA3, respectively. The first, second, and third input diffraction patterns IGP1, IGP2, and IGP3 may not overlap each other on a plane.

The first, second, and third input diffraction patterns IGP1, IGP2, and IGP3 may diffract incident light to change a path of the light. Each of the first, second, and third input diffraction patterns IGP1, IGP2, and IGP3 may have a predetermined grating shape that determines the angle of diffraction depending on the wavelength of light. The first, second, and third input diffraction patterns IGP1, IGP2, and IGP3 may have different grating shapes from each other. Therefore, when a light beam is input to the first, second, and third input diffraction patterns IGP1, IGP2, and IGP3, the first, second, and third input diffraction patterns IGP1, IGP2, and IGP3 may diffract the light beam at different angles.

The display panel DP may be disposed on the rear surface of the waveguide WGP. The display panel DP is disposed corresponding to the input diffraction regions IGA. In one embodiment, for example, the first, second, and third display units DU1, DU2, and DU3 may be disposed corresponding to the first, second, and third input diffraction regions IGA1, IGA2, and IGA3, respectively.

The first, second, and third display light beams RDL, GDL, and BDL output from the first, second, and third display units DU1, DU2, and DU3 are directly provided to the waveguide WGP.

The first input diffraction pattern IGP1 diffracts the first display light beam RDL input to the waveguide WGP to change the path of the first display light beam RDL. The diffracted first display light beam RDL moves along the light guide region LGA of the waveguide WGP and is provided to the output diffraction region OGA. The second input diffraction pattern IGP2 diffracts the second display light beam GDL input to the waveguide WGP to change the path of the second display light beam GDL. The diffracted second display light beam GDL moves along the light guide region LGA of the waveguide WGP and is provided to the output diffraction region OGA. The third input diffraction pattern IGP3 diffracts the third display light beam BDL input to the waveguide WGP to change the path of the third display light beam BDL. The diffracted third display light beam BDL moves along the light guide region LGA of the waveguide WGP and is provided to the output diffraction region OGA.

The light guide unit LGU3 further includes first, an output diffraction pattern OGP. In an embodiment, for example, the output diffraction pattern OGP is disposed on the upper surface of the waveguide WGP corresponding to the output diffraction region OGA. The output diffraction region OGA may be defined as a viewing region that provides an image to a user US.

The output diffraction pattern OGP directs the first, second, and third display light beams RDL, GDL, and BDL provided from the light guide region LGA to outside. When the eyeballs of the user US are located in the viewing region, the user may receive the first, second, and third display light beams RDL, GDL, and BDL output from the light guide unit LGU3 in the output diffraction region OGA. In such an embodiment, the first, second, and third display light beams RDL, GDL, and BDL are diffracted by the output diffraction pattern OGP and are output, in the output diffraction region OGA. In such an embodiment, the output first, second, and third display light beams RDL, GDL, and BDL may be mixed and provided to the eyeballs of a user US as a display light FDL.

In an embodiment, as described above, the augmented reality display device 110_2 uses the display panel DP divided into a plurality of display units, where each display unit outputs a display light beam with a different wavelength, and outputs a plurality of display light beams in a same output diffraction region OGA. In such an embodiment, the final display light FDL provided to the user may have a higher luminance than the individual display light.

Accordingly, the overall luminance of the augmented reality display device 110_2 may increase. In an embodiment, as shown in FIG. 8, the number of waveguides may be reduced to one, and as a result, the augmented reality display device 110_2 having a simple structure and a thin thickness may be implemented.

Figure 9:
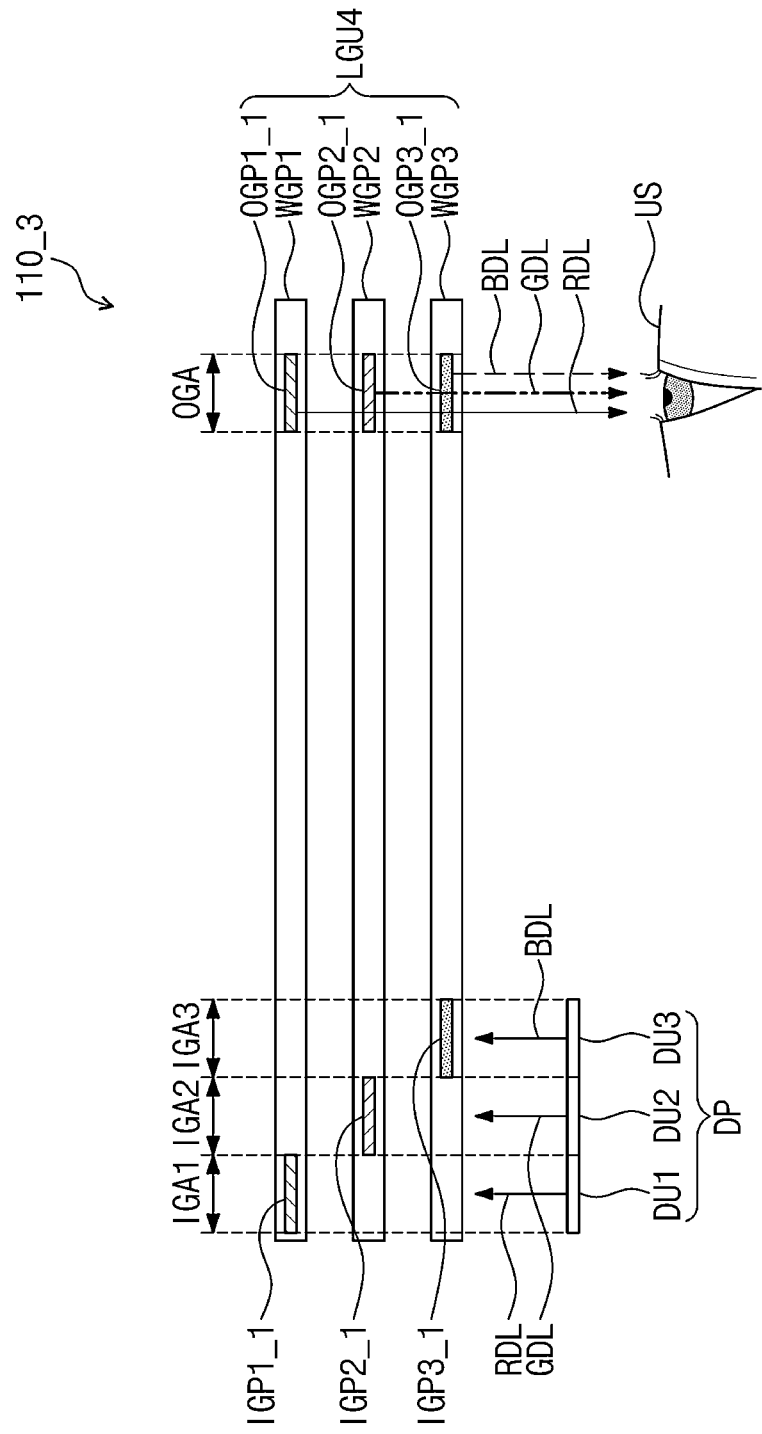
FIG. 9 is a sectional view of a display device according to another alternative embodiment of the invention.

FIG. 9 is a sectional view of an augmented reality display device according to another alternative embodiment of the invention.

Referring to FIG. 9, in an embodiment of an augmented reality display device 110_3 according to the invention, a light guide unit LGU4 may include first, second, and third waveguides WGP1, WGP2, and WGP3, and first, second, and third input diffraction patterns IGP1_1, IGP2_1, and IGP3_1. The first input diffraction pattern IGP1_1 is disposed in the first waveguide WGP1 corresponding to the first input diffraction region IGA1, and the second input diffraction pattern IGP2_1 is disposed in the second waveguide WGP2 corresponding to the second input diffraction region IGA2. The third input diffraction pattern IGP3_1 is disposed in the third waveguide WGP3 corresponding to the third input diffraction region IGA3. Each of the first, second, and third input diffraction patterns IGP1_1, IGP2_1, and IGP3_1 may include a diffraction grating generated by recording an interference fringe in a photosensitive polymer.

The light guide unit LGU4 may further include a first output diffraction pattern OGP1_1, a second output diffraction pattern OGP2_1, and a third output diffraction pattern OGP3_1 disposed in the output diffraction region OGA. The first, second, and third output diffraction patterns OGP1_1, OGP2_1, and OGP3_1 may be disposed in the first, second, and third waveguides WGP1, WGP2, and WGP3, respectively. Each of the first, second, and third output diffraction patterns OGP1_1, OGP2_1, and OGP3_1 may include a diffraction grating generated by recording an interference fringe in a photosensitive polymer.

Figure 10:
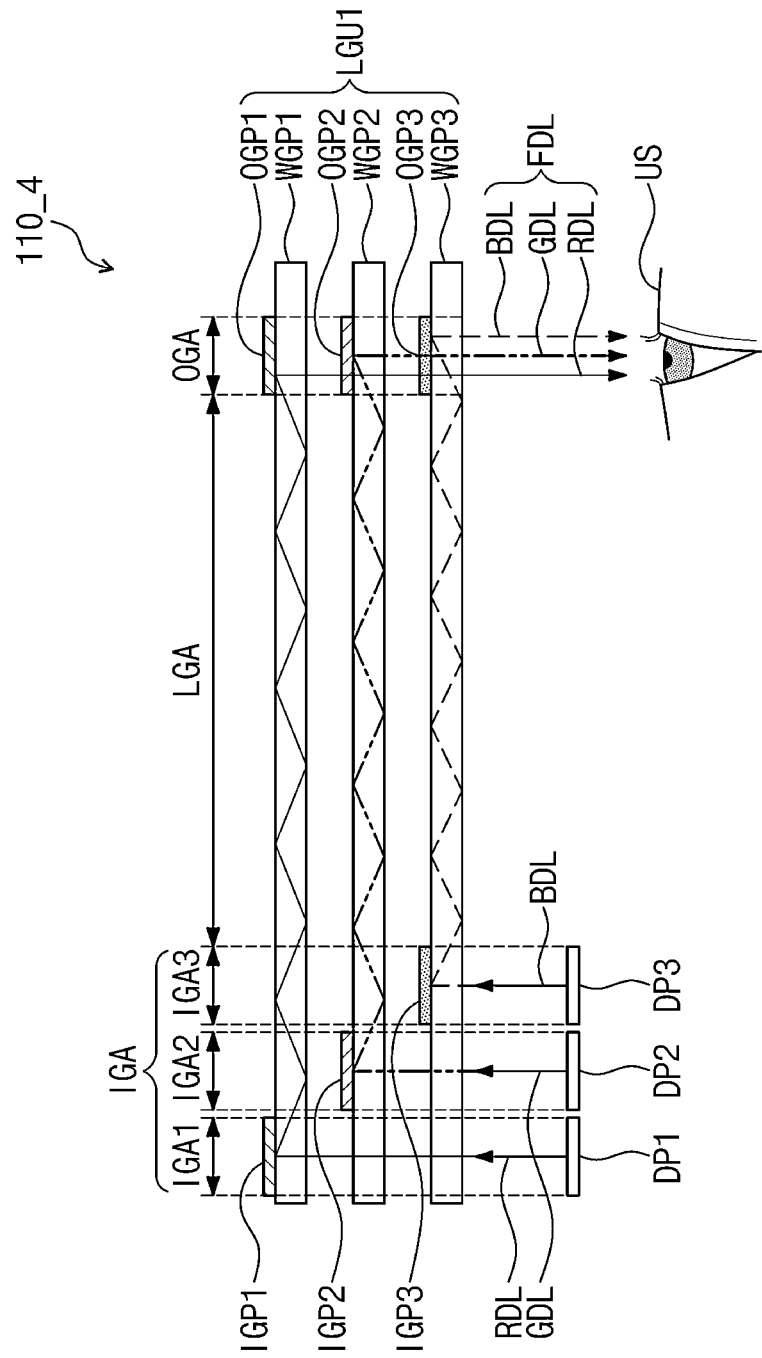
FIG. 10 is a sectional view of a display device according to another alternative embodiment of the invention.

FIG. 10 is a sectional view of an augmented reality display device according to another alternative embodiment of the invention.

Referring to FIG. 10, an embodiment of an augmented reality display device 110_4 according to the invention may include a first display panel DP1, a second display panel DP2, and a third display panel DP3. The first display panel DP1 generates a first display light beam RDL with a first wavelength, and the second display panel DP2 generates a second display light beam GDL with a second wavelength. The third display panel DP3 generates a third display light beam BDL with a third wavelength. The first display light beam RDL may have a wavelength of red color, the second display light beam GDL may have a wavelength of green color, and the third display light beam BDL may have a wavelength of blue color.

The first display panel DP1 is disposed corresponding to the first input diffraction area IGA1 to provide the first display light beam RDL to the first input diffraction pattern IGP1 of the light guide unit LGU1. The second display panel DP2 is disposed corresponding to the second input diffraction region IGA2 to provide the second display light beam GDL to the second input diffraction pattern IGP2 of the light guide unit LGU1. The third display panel DP3 is disposed corresponding to the third input diffraction region IGA3 to provide the third display light beam BDL to the third input diffraction pattern IGP3 of the light guide unit LGU1.

Since the light guide unit LGU1 of FIG. 10 has the same configuration as the light guide unit LGU1 shown in FIG. 3A, any repetitive description of the configuration of the same or like elements of the light guide unit LGU1 will not be repeated.

Figure 11:
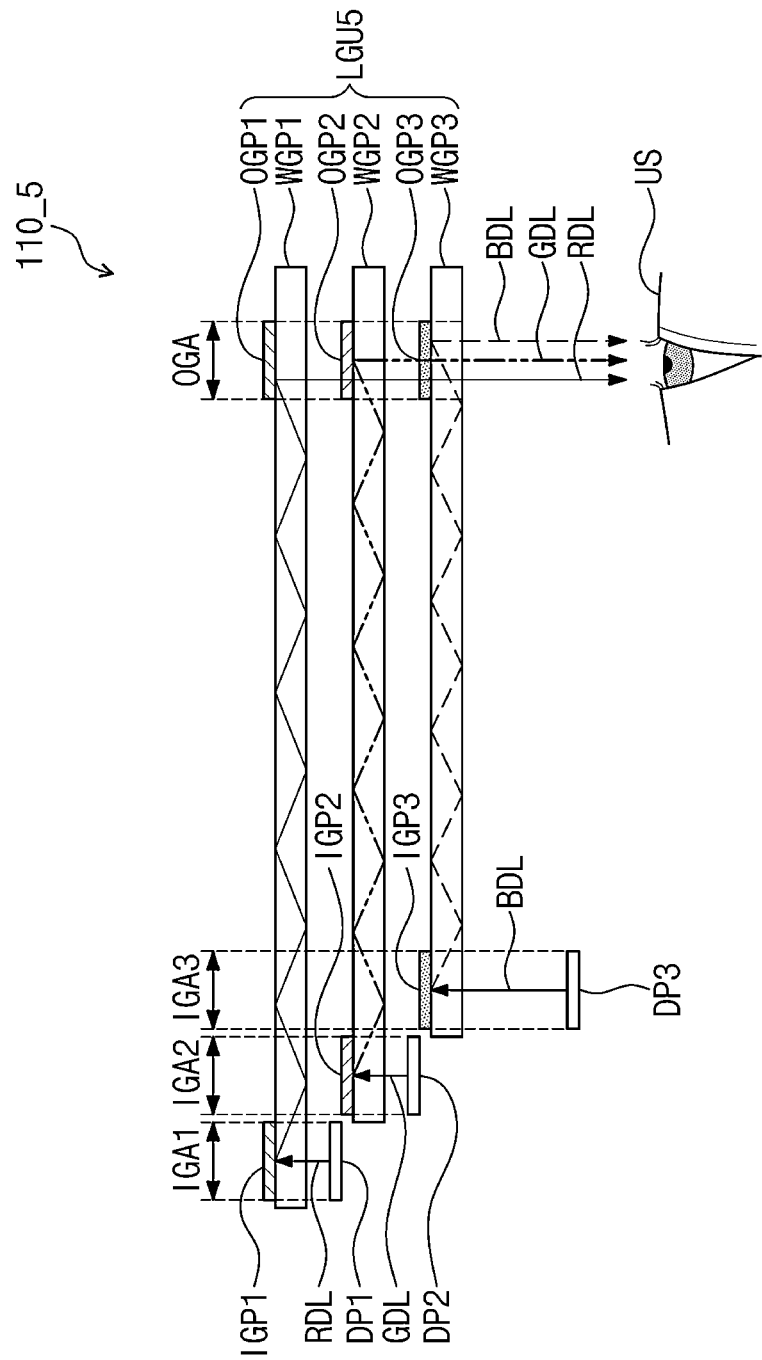
FIG. 11 is a sectional view of a display device according to another alternative embodiment of the invention.

FIG. 11 is a sectional view of an augmented reality display device according to another alternative embodiment of the invention.

Referring to FIG. 11, an embodiment of an augmented reality display device 110_5 according to the invention may include a first display panel DP1, a second display panel DP2, a third display panel DP3, and a light guide unit LGU5.

The light guide unit LGU5 includes first, second, and third waveguides WGP1, WGP2, and WGP3 that are sequentially disposed or stacked one on another. In one embodiment, for example, the first, second, and third waveguides WGP1, WGP2, and WGP3 may have different sizes from each other. In one embodiment, for example, the first waveguide WGP1 has a larger size than the second and third waveguides WGP2 and WGP3. In such an embodiment, the second waveguide WGP2 may expose the rear surface of the first waveguide WGP1 corresponding to the first input diffraction region IGA1. In such an embodiment, the third waveguide WGP3 may expose the rear surface of the second waveguide WGP2 corresponding to the second input diffraction region IGA2.

The first display panel DP1 is disposed on the rear surface of the first waveguide WGP1 corresponding to the first input diffraction region IGA1, and the second display panel DP2 is disposed on the rear surface of the second waveguide WGP2 corresponding to the second input diffraction region IGA2. The third display panel DP3 is disposed on the rear surface of the third waveguide WGP3 corresponding to the third input diffraction region IGA3. Accordingly, the first display light beam RDL output from the first display panel DP1 may be directly provided to the first waveguide WGP1 without passing through the second and third waveguides WGP2 and WGP3. In such an embodiment, the second display light beam GDL output from the second display panel DP2 may be directly provided to the second waveguide WGP2 without passing through the third waveguide WGP3. Accordingly, the augmented reality display device 110_5 may minimize light loss occurring in the process in which the first, second, and third display light beams RDL, GDL, and BDL are provided to the light guide unit LGU5.

Figure 12:
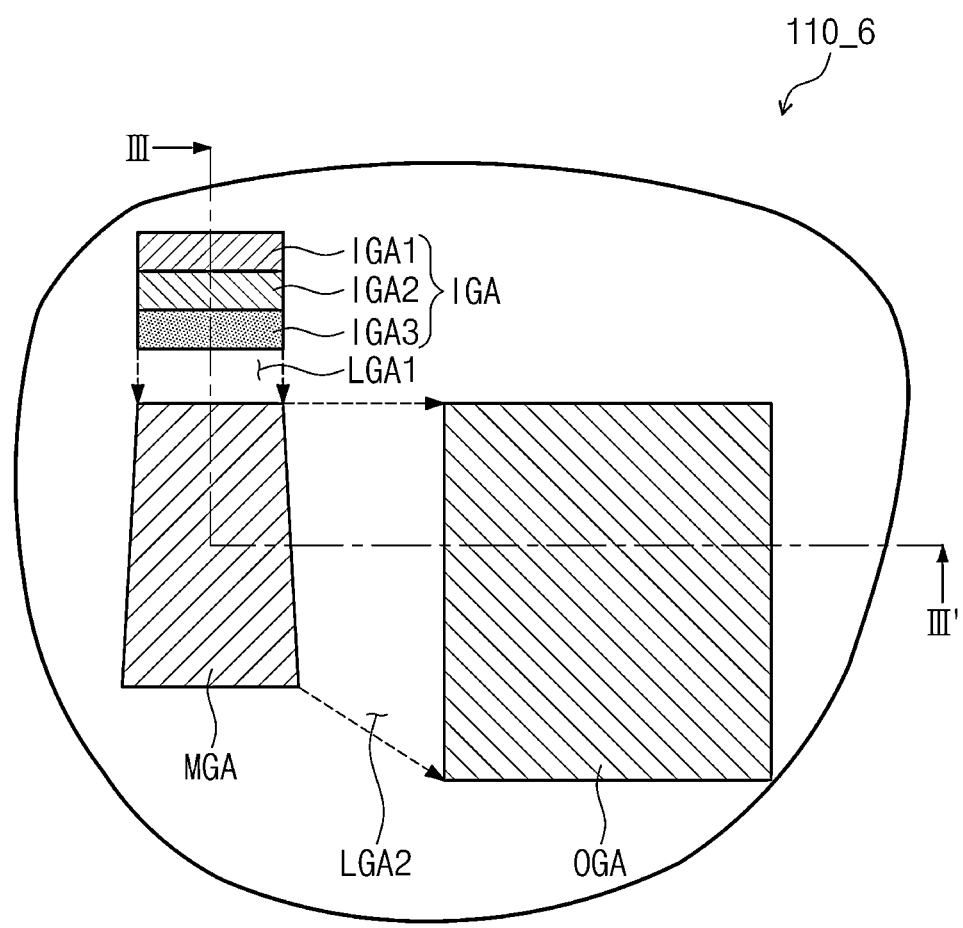
FIG. 12 is a plan view showing a display device according to another alternative embodiment of the invention.
Figure 13:
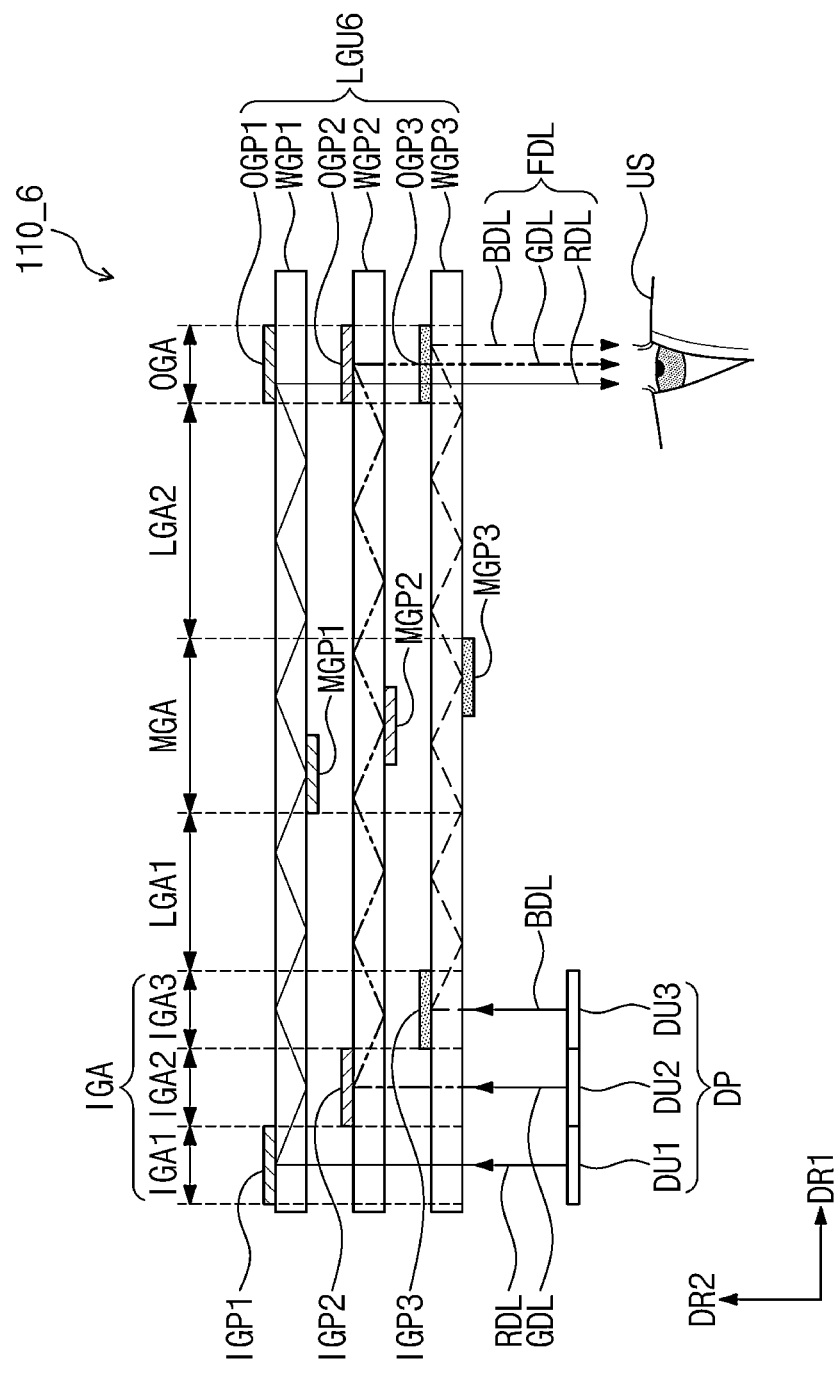
FIG. 13 is a sectional view taken along line shown in FIG. 12.

FIG. 12 is a plan view showing an augmented reality display device according to another alternative embodiment of the invention, and FIG. 13 is a sectional view taken along line III-III' shown in FIG. 12.

Referring to FIGS. 12 and 13, in an embodiment of an augmented reality display device 110_6 according to the invention, a light guide unit LGU6 receives first, second, and third display light beams RDL, GDL, and DBL from first, second, and third units DU1, DU2, and DU3 of the display panel DP.

The light guide unit LGU6 may include an input diffraction region IGA, an intermediate diffraction region MGA and an output diffraction region OGA. The intermediate diffraction region MGA may be disposed between the input diffraction region IGA and the output diffraction region. OGA. The light guide unit LGU6 may further include a first light guide region LGA1 located between the input diffraction region IGA and the intermediate diffraction region MGA and a second light guide region LGA2 located between the intermediate diffraction region MGA and the output diffraction region OGA.

The display panel DP is disposed on the rear surface of the light guide unit LGU6 corresponding to the input diffraction region IGA. The first, second, and third display units DU1, DU2, and DU3 may be disposed to correspond to the first, second, and third input diffraction regions IGA1, IGA2, and IGA3, respectively.

The traveling directions of first, second, and third display light beams RDL, GDL, and BDL may be changed to the first light guide region LGA1 in the first, second, and third input diffraction regions IGA1, IGA2, and IGA3, respectively. The first, second, and third display light beams RDL, GDL, and BDL, the traveling directions of which are changed, may be provided to the first light guide region LGA1 and then diffracted to the intermediate diffraction region MGA.

The light guide unit LGU6 may further include first, second, and third intermediate diffraction patterns MGP1, MGP2, and MGP3. The first intermediate diffraction pattern MGP1 may be disposed on an upper surface or a rear surface of the first waveguide WGP1 corresponding to the intermediate diffraction region MGA. The second intermediate diffraction pattern MGP2 may be disposed on an upper surface or a rear surface of the second waveguide WGP2 corresponding to the intermediate diffraction region MGA. The third intermediate diffraction pattern MGP3 may be disposed on an upper surface or a rear surface of the third waveguide WGP3 corresponding to the intermediate diffraction region MGA.

In the intermediate diffraction region MGA, the first, second, and third display light beams RDL, GDL, and BDL may be diffracted by the first, second, and third intermediate diffraction patterns MGP1, MGP2, and MGP3, respectively, which may lead to changes of the traveling directions thereof. The traveling directions of the first, second, and third display light beams RDL, GDL, and BDL diffracted in the intermediate diffraction region MGA may be changed to the second light guide region LGA2, respectively. The first, second, and third display light beams RDL, GDL, and BDL of which the traveling directions are changed may be provided to the second light guide region LGA2 and then guided to the output diffraction region OGA. The first, second, and third display light beams RDL, GDL, and BDL may be output from the output diffraction region OGA to the outside.

As described above, in an embodiment of the augmented reality display device 110_6 including the intermediate diffraction region MGA, the display panel includes a plurality of display units and each display unit outputs a display light beam with a different wavelength. In such an embodiment, the augmented reality display device 110_6 having an improved overall luminance and a simple structure may be implemented as described above.

In an embodiment, where the first to third display light beams are guided directly to the output diffraction region OGA without going through the intermediate diffraction region MGA, the light loss of the first, second, and third display light beams RDL, GDL, and BDL may be minimized. Accordingly, the augmented reality display device 110 shown in FIGS. 2 and 3A may have a higher luminance than the augmented reality display device 110_6 shown in FIGS. 12 and 13.

An embodiment of the augmented reality display device according to the invention uses a display panel divided into a plurality of display units, where each display unit outputs a display light beam with a different wavelength, and outputs a plurality of display light beams in a same output diffraction region. In such an embodiment, the final display light finally provided to the user may have a higher luminance than the individual display light beams. As a result, the overall luminance of the augmented reality display device may be improved, and by employing the display panel, the augmented reality display device having a simple structure may be implemented.

The invention should not be construed as being limited to the embodiments set forth herein. Rather, these embodiments are provided so that this disclosure will be thorough and complete and will fully convey the concept of the invention to those skilled in the art.

While the invention has been particularly shown and described with reference to embodiments thereof, it will be understood by those of ordinary skill in the art that various changes in form and details may be made therein without departing from the spirit or scope of the invention as defined by the following claims.

What is claimed is:

1. A display device comprising:
   a display panel including a plurality of display units, wherein the display units generate a plurality of display light beams with different wavelengths, respectively, and each of the display units generates light beams of a single color; and
   a light guide unit which receives the display light beams from the display units,
   wherein the light guide unit includes:
      a plurality of input diffraction regions which changes traveling directions of the display light beams, respectively;
      a plurality of waveguides to which the display light beams are provided;
      a plurality of input diffraction patterns disposed on the waveguides or disposed in the waveguides corresponding to the input diffraction regions, respectively, to change the traveling direction of the display light beams, wherein the input diffraction patterns do not overlap each other in a thickness direction of the waveguides;
      a light guide area which guides the display light beams with the changed traveling directions; and
      an output diffraction region which directs the guided display light beams to a predetermined direction,
   wherein the plurality of input diffraction patterns overlap with the plurality of display units, respectively to receive the display light beams of the single color, respectively.

2. The display device of claim 1, wherein the display units include:
   a first display unit which generates a first display light beam with a first wavelength among the display light beams;
   a second display unit which generates a second display light beam with a second wavelength among display light beams; and
   a third display unit which generates a third display light beam with a third wavelength among the display light beams,
   wherein the first wavelength, the second wavelength and the third wavelength are different from each other.

3. The display device of claim 2, wherein the input diffraction regions include:
   a first input diffraction region in which a traveling direction of the first display light beam is changed;
   a second input diffraction region in which a traveling direction of the second display light beam is changed; and
   a third input diffraction region in which a traveling direction of the third display light beam is changed.

4. The display device of claim 3, wherein the waveguides includes:
- a first waveguide to which the first display light beam is provided;
- a second waveguide to which the second display light beam is provided; and
- a third waveguide to which the third display light beam is provided.

5. The display device of claim 4, wherein the input diffraction patterns includes:
- a first input diffraction pattern disposed on the first waveguide corresponding to the first input diffraction region to change the traveling direction of the first display light beam;
- a second input diffraction pattern disposed on the second waveguide corresponding to the second input diffraction region to change the traveling direction of the second display light beam; and
- a third input diffraction pattern disposed on the third waveguide corresponding to the third input diffraction region to change the traveling direction of the third display light beam.

6. The display device of claim 5, wherein the light guide unit further includes:
- a first output diffraction pattern disposed on the first waveguide corresponding to the output diffraction region to direct the first display light beam to the predetermined direction;
- a second output diffraction pattern disposed on the second waveguide corresponding to the output diffraction region to direct the second display light beam to the predetermined direction; and
- a third output diffraction pattern disposed on the third waveguide corresponding to the output diffraction region to direct the third display light beam to the predetermined direction.

7. The display device of claim 4, wherein the input diffraction patterns includes:
- a first input diffraction pattern disposed in the first waveguide corresponding to the first input diffraction region to change the traveling direction of the first display light beam;
- a second input diffraction pattern disposed in the second waveguide corresponding to the second input diffraction region to change the traveling direction of the second display light beam; and
- a third input diffraction pattern disposed in the third waveguide corresponding to the third input diffraction region to change the traveling direction of the third display light beam.

8. The display device of claim 7, wherein the light guide unit further includes:
- a first output diffraction pattern disposed in the first waveguide corresponding to the output diffraction region to direct the first display light beam to the predetermined direction;
- a second output diffraction pattern disposed in the second waveguide corresponding to the output diffraction region to direct the second display light beam to the predetermined direction; and
- a third output diffraction pattern disposed in the third waveguide corresponding to the output diffraction region to direct the third display light beam to the predetermined direction.

9. The display device of claim 4, wherein
the first to third waveguides are sequentially disposed one on another, and
the display panel is disposed on a rear surface of a waveguide disposed at a bottom, among the first to third waveguides.

10. The display device of claim 3, wherein the light guide unit includes:
- a first waveguide which receives the first display light beam; and
- a second waveguide which receives the second display light beam and the third display light beam.

11. The display device of claim 10, wherein the input diffraction patterns includes:
- a first input diffraction pattern disposed on the first waveguide corresponding to the first input diffraction region to change the traveling direction of the first display light beam;
- a second input diffraction pattern disposed on the second waveguide corresponding to the second input diffraction region to change the traveling direction of the second display light beam; and
- a third input diffraction pattern disposed on the second waveguide corresponding to the third input diffraction region to change the traveling direction of the third display light beam.

12. The display device of claim 11, wherein the light guide unit further includes:
- a first output diffraction pattern disposed on the first waveguide corresponding to the output diffraction region to direct the first display light beam to the predetermined direction; and
- a second output diffraction pattern disposed on the second waveguide corresponding to the output diffraction region to direct the second and third display light beams to the predetermined direction.

13. The display device of claim 3, wherein the light guide unit includes:
- a waveguide which receives the first to third display light beams.

14. The display device of claim 13, wherein the input diffraction patterns includes:
- a first input diffraction pattern disposed on the waveguide corresponding to the first input diffraction region to change the traveling direction of the first display light beam;
- a second input diffraction pattern disposed on the waveguide corresponding to the second input diffraction region to change the traveling direction of the second display light beam; and
- a third input diffraction pattern disposed on the waveguide corresponding to the third input diffraction region to change the traveling direction of the third display light beam.

15. The display device of claim 14, wherein the light guide unit further includes:
- an output diffraction pattern disposed on the waveguide corresponding to the output diffraction region to direct the first to third display light beams to the predetermined direction.

16. The display device of claim 2, wherein the light guide unit further includes:
- an intermediate diffraction region disposed between the input diffraction region and the output diffraction region to change the traveling directions of the display light beams to the output diffraction region.

17. The display device of claim 2, wherein the first display light beam has a wavelength of red color, the second display light beam has a wavelength of green color, and the third display light beam has a wavelength of blue color.

18. The display device of claim 17, wherein
the first display unit includes red pixels,
the second display unit includes green pixels, and
the third display unit includes blue pixels.

19. The display device of claim 2, wherein the display panel is an organic light emitting display panel.

20. A display device comprising:
a first display panel which generates a first display light beam with a first wavelength;
a second display panel which generates a second display light beam with a second wavelength;
a third display panel which generates a third display light beam with a third wavelength; and
a light guide unit which receives the first to third display light beams from the first to third display panels,
wherein each of the display panels generates light beams of a single color,
wherein the first wavelength, the second wavelength and the third wavelength are different from each other, and
wherein the light guide unit includes:
first to third input diffraction regions which change traveling directions of the first to third display light beams, respectively;
first to third waveguides to which the first to third display light beams are provided;
first to third input diffraction patterns disposed on the first to third waveguides or disposed in the first to third waveguides corresponding to the first to third input diffraction regions, respectively, to change the traveling direction of the first to third display light beams, wherein the first to third input diffraction patterns do not overlap each other in a thickness direction of the first to third waveguides;
a light guide region which guides the first to third display light beams with the changed traveling directions; and
an output diffraction region which directs the guided first to third display light beams to a predetermined direction,
wherein the first to third input diffraction patterns overlap with the first to third display panels, respectively to receive the first to third display light beams of the single color, respectively.

* * * * *